(12) United States Patent
Laroche et al.

(10) Patent No.: US 12,363,278 B2
(45) Date of Patent: Jul. 15, 2025

(54) HIGH LEVEL SYNTAX FOR VIDEO CODING AND DECODING

(71) Applicant: CANON KABUSHIKI KAISHA, Tokyo (JP)

(72) Inventors: Guillaume Laroche, Saint Aubin d'Aubigné (FR); Naël Ouedraogo, Val d'Anast (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/910,745

(22) PCT Filed: Mar. 5, 2021

(86) PCT No.: PCT/EP2021/055661
§ 371 (c)(1),
(2) Date: Sep. 9, 2022

(87) PCT Pub. No.: WO2021/180595
PCT Pub. Date: Sep. 16, 2021

(65) Prior Publication Data
US 2023/0108509 A1  Apr. 6, 2023

(30) Foreign Application Priority Data

Mar. 11, 2020 (GB) .................................. 2003562
Apr. 20, 2020 (GB) .................................. 2005741

(51) Int. Cl.
*H04N 19/70* (2014.01)
*H04N 19/105* (2014.01)
(Continued)

(52) U.S. Cl.
CPC ......... *H04N 19/105* (2014.11); *H04N 19/174* (2014.11); *H04N 19/46* (2014.11); *H04N 19/70* (2014.11)

(58) Field of Classification Search
CPC .... H04N 19/70; H04N 19/105; H04N 19/174; H04N 19/46; H04N 19/124; H04N 9/172; H04N 19/157
See application file for complete search history.

(56) References Cited

U.S. PATENT DOCUMENTS 11,632,569 B2 * 4/2023 Li ........................ H04N 19/182
                                                   375/240.02
11,683,522 B2 * 6/2023 Li .......................... H04N 19/82
                                                     375/240
(Continued)

FOREIGN PATENT DOCUMENTS

CN        104662906 A     5/2015
CN        107211122 A     9/2017
(Continued)

OTHER PUBLICATIONS

Benjamin Bross, et al., Versatile Video Coding (Draft 8), Joint Video Experts Team (JVET) of ITU-T SG 16 WP 3 and ISO/IEC JTC 1/SC 29/WG 11, 17th Meeting: Brussels, BE, Jan. 7-17, 2020, Doc. No. JVET-Q2001-v7.
(Continued)

*Primary Examiner* — Tsion B Owens
(74) *Attorney, Agent, or Firm* — Canon U.S.A., Inc. IP Division

(57) ABSTRACT

A method of decoding video data from a bitstream, the bitstream comprising video data corresponding to one or more slices. The bitstream comprises a picture header comprising syntax elements to be used when decoding one or more slices, and a slice header comprising syntax elements to be used when decoding a slice. The decoding comprises in a case where information which can be signalled in the picture header or in the slice header is signalled in the picture header, a picture header is to be signalled in a slice header, permitting parsing of information which may oth-
(Continued)

erwise be signalled in a slice header and a picture header, in only one of the slice header or picture header; imposing that the picture header is not in the slice header, and decoding said bitstream using said syntax elements.

14 Claims, 13 Drawing Sheets

(51) Int. Cl.
*H04N 19/174* (2014.01)
*H04N 19/46* (2014.01)

(56) References Cited

U.S. PATENT DOCUMENTS

| | | | |
|---|---|---|---|
| 11,716,478 B2* | 8/2023 | Li | H04N 19/176 348/404.1 |
| 12,063,362 B2* | 8/2024 | Zhang | H04N 19/70 |
| 2005/0053158 A1 | 3/2005 | Regunathan | |
| 2014/0092991 A1 | 4/2014 | Sullivan | |
| 2016/0103898 A1* | 4/2016 | Zheng | G06F 16/289 707/602 |
| 2021/0136419 A1* | 5/2021 | Hsiang | H04N 19/174 |
| 2022/0256201 A1* | 8/2022 | Chen | H04N 19/136 |
| 2022/0394263 A1* | 12/2022 | Li | H04N 19/174 |

FOREIGN PATENT DOCUMENTS

| | | |
|---|---|---|
| GB | 2590634 A | 7/2021 |
| WO | 2012109990 A1 | 8/2012 |
| WO | 2019245712 A1 | 12/2019 |
| WO | 2021/169969 A1 | 9/2021 |

OTHER PUBLICATIONS

Hendry, et al., [AHG9]: On picture level and slice level tool parameters, Joint Video Experts Team (JVET) of ITU-T SG 16 WP 3 and ISO/IEC JTC 1/SC 29/WG 11, 17th Meeting, Brussels, BE, Jan. 7-17, 2020, Doc. No. JVET-Q0200-v-2, XP030222889.

Jonatan Samuelsson, et al., AHG: Picture Header in Slice Header, Joint Video Experts Team (JVET) of ITU-T SG 16 WP 3 and ISO/IEC JTC 1/SC 29/WG 11, 17th Meeting, Brussels, BE, Jan. 7-17, 2020, Doc. No. JVET-Q0775, XP030224172.

Benjamin Bross, et al., Versatile Video Coding (Draft 8), Joint Video Experts Team (JVET) of ITU-T SG 16 WP 3 and ISO/IEC JTC 1/SC 29/WG 11, 7th Meeting, Brussels, BE, Jan. 7-17, 2020, Doc. No. JVET-Q2001-vD.

Fan Rong, Video Quality Assessment Algorithm of H.264 Based On Region of Interest, Dissertation for Master's Degree in Engineering, Harbin Institute of Technology, Jul. 2014, pp. 1-58, English abstract is on fifth page.

* cited by examiner

HIGH LEVEL SYNTAX FOR VIDEO CODING AND DECODING

CROSS REFERENCE TO RELATED APPLICATION

This application is the National Phase application of PCT Application No. PCT/EP2021/055661, filed on Mar. 5, 2021. This application claims the benefit under 35 U.S.C. § 119(a)-(d) of United Kingdom Patent Application No. 2003562.2, filed on Mar. 11, 2020 and United Kingdom Patent Application No. 2005741.0, filed on Apr. 20, 2020. The above cited patent applications are incorporated herein by reference in their entirety.

FIELD OF INVENTION

The present invention relates to video coding and decoding, and in particular to the high level syntax used in the bitstream.

BACKGROUND

Recently, the Joint Video Experts Team (JVET), a collaborative team formed by MPEG and ITU-T Study Group 16's VCEG, commenced work on a new video coding standard referred to as Versatile Video Coding (VVC). The goal of VVC is to provide significant improvements in compression performance over the existing HEVC standard (i.e., typically twice as much as before) and to be completed in 2020. The main target applications and services include—but not limited to—360-degree and high-dynamic-range (HDR) videos. In total, JVET evaluated responses from 32 organizations using formal subjective tests conducted by independent test labs. Some proposals demonstrated compression efficiency gains of typically 40% or more when compared to using HEVC. Particular effectiveness was shown on ultra-high definition (UHD) video test material. Thus, we may expect compression efficiency gains well-beyond the targeted 50% for the final standard.

The JVET exploration model (JEM) uses all the HEVC tools and has introduced a number of new tools. These changes have necessitated a change to the structure of the bitstream, and in particular to the high-level syntax which can have a impact on the overall bitrate of the bitstream.

SUMMARY

The present invention relates to an improvement to the high level syntax structure, which leads to a reduction in complexity without any degradation in coding performance.

According to a first aspect of the invention there is provided a method of decoding video data from a bitstream, the bitstream comprising video data corresponding to one or more slices, wherein the bitstream comprises a picture header comprising syntax elements to be used when decoding one or more slices, and a slice header comprising syntax elements to be used when decoding a slice, and the decoding comprises in a case where information which can be signalled in the picture header or in the slice header is signalled in the picture header, imposing (e.g. applying a constraint) that the picture header is not in the slice header; and decoding said bitstream using said syntax elements.

Optionally, the decoding further comprises parsing a first syntax element indicating whether said information is to be signalled in a picture header and permitting the parsing of the information which may be signalled in a slice header and a picture header in only one of the slice header or picture header based on the first syntax element.

Optionally, the first syntax element is a information in picture parameter set flag or an information in picture header flag.

Optionally, parsing of the information in the slice header is not permitted in the case that the first syntax element indicates that the information is signalled in the picture header.

Optionally, the method further comprises parsing a second syntax element indicating whether the picture header is in the slice header or not, wherein it is a requirement of bitstream conformance that the second syntax element indicates that the picture header is not in the slice header in the case that the first syntax element indicates that the information is signalled in the picture header.

Optionally, the information includes one or more of quantization parameter value information, reference picture list information, deblocking filter information, sample adaptive offset (SAO) information, weighted prediction information and adaptive loop filtering (ALF) information.

Optionally, the information includes all information that may be signaled in a picture header and a slice header.

Optionally, the reference picture list information includes one or more of a slice_collocated_from_l0_flag, a slice_collocated_ref_idx, a ph_collocated_from_l0_flag and a ph_collocated_ref_idx.

According to a second aspect of the invention there is provided a method of encoding video data into a bitstream, the video data corresponding to one or more slices, wherein the bitstream comprises a picture header comprising syntax elements to be used when decoding one or more slices, and a slice header comprising syntax elements to be used when decoding a slice, and the encoding comprises in a case information which can be signalled in the picture header or in the slice header is signalled in the picture header; signalling that the picture header is not in the slice header, and encoding said video data using said syntax elements.

Optionally, the encoding further comprises encoding a first syntax element indicating whether said information is to be signalled in a picture header and permitting the encoding of the information which may be signalled in a slice header and a picture header in only one of the slice header or picture header based on the first syntax element.

Optionally, the first syntax element is an information in picture parameter set flag or an information in picture header flag.

Optionally, encoding of the information in the slice header is not permitted in the case that the first syntax element indicates that the information is signalled in the picture header.

Optionally, the method further comprises encoding a second syntax element indicating whether the picture header is in the slice header or not, wherein it is a requirement of bitstream conformance that the second syntax element indicates that the picture header is not in the slice header in the case that the first syntax element indicates that the information is signalled in the picture header.

Optionally, the information includes one or more of quantization parameter value information, reference picture list information, deblocking filter information, sample adaptive offset (SAO) information, weighted prediction information and adaptive loop filtering (ALF) information.

Optionally, the information includes all information that may be signaled in a picture header and a slice header.

Optionally, the reference picture list information includes one or more of a slice_collocated_from_l0_flag, a slice_collocated_ref_idx, a ph_collocated_from_l0_flag and a ph_collocated_ref_idx.

In an alternative aspect of the invention there is provided a method of decoding video data from a bitstream, the bitstream comprising video data corresponding to one or more slices, wherein the bitstream comprises a picture header comprising syntax elements to be used when decoding one or more slices, and a slice header comprising syntax elements to be used when decoding a slice, and the decoding comprises in a case where information which can be signalled in the picture header or in the slice header is signalled in the slice header, imposing that the picture header is not in the slice header; and decoding said bitstream using said syntax elements.

According to another aspect of the present invention, there is provided a method of decoding video data from a bitstream, the bitstream comprising video data corresponding to one or more slices, wherein the bitstream comprises a picture header comprising syntax elements to be used when decoding one or more slices, and a slice header comprising syntax elements to be used when decoding a slice, and the decoding comprises treating as not applicable, in combination, (a) a syntax element indicating that tool information is signalled in a picture header rather than in a slice header and (b) a syntax element indicating that a picture header is signalled in a slice header; and decoding said bitstream using said syntax elements. The decoding does not occur when said syntax elements (a) and (b) treated as not applicable in combination are present.

According to a related aspect of the present invention, a bitstream comprises: video data corresponding to one or more slices; a picture header comprising syntax elements to be used when decoding one or more slices; and a slice header comprising syntax elements to be used when decoding a slice. The bitstream has a constraint that there must not be present therein, in combination, (a) a syntax element indicating that tool information is signalled in a picture header rather than in a slice header and (b) a syntax element indicating that the (a) picture header is signalled in a slice header. The tool information may be any one of quantization parameter value information, reference picture list information, deblocking filter information, sample adaptive offset (SAO) information, weighted prediction information and adaptive loop filtering (ALF) information. In a related aspect there is provided a method of decoding said bitstream In another related aspect there is provided a decoder configured to decode said bitstream. The bitstream may be constrained for conformity with a video coding standard. In an embodiment, said video coding standard is the Versatile Video Coding standard. The constraint may be applied systematically throughout the bitstream. For example, in embodiments, the constraint is applied for any or all of sequences, pictures and slices in a bitstream.

According to another aspect of the present invention, there is provided a method of decoding video data from a bitstream, the bitstream comprising video data corresponding to one or more slices, wherein the bitstream comprises a picture header comprising syntax elements to be used when decoding one or more slices, and a slice header comprising syntax elements to be used when decoding a slice, and the decoding comprises treating as not applicable, in combination, (a) a syntax element indicating that tool information is signalled in a slice header rather than in a picture header and (b) a syntax element indicating that a picture header is signalled in a slice header; and decoding said bitstream using said syntax elements. The decoding does not occur when said syntax elements (a) and (b) treated as not applicable in combination are present.

According to another aspect of the present invention, there is provided a method of decoding video data from a bitstream, the bitstream comprising video data corresponding to one or more slices, wherein the bitstream comprises a picture header comprising syntax elements to be used when decoding one or more slices, and a slice header comprising syntax elements to be used when decoding a slice, wherein a picture header is to be signalled in a slice header and wherein the parsing of information which may otherwise be signalled in a slice header and a picture header, in only one of the slice header or picture header are constrained; and the decoding comprises in case where a syntax element (xxx_info_in_ph_flag), indicates the presence of tool information in the picture header (e.g. when xxx_info_in_ph_flag=1), the picture header is not signalled in a slice header (e.g. force picture_header_in_slice_header_flag to be 0).

According to a related aspect of the present invention, a bitstream comprises: video data corresponding to one or more slices; a picture header comprising syntax elements to be used when decoding one or more slices; and a slice header comprising syntax elements to be used when decoding a slice. The bitstream has a constraint that there must not be present therein, in combination, (a) a syntax element indicating that tool information is signalled in a slice header rather than in a picture header and (b) a syntax element indicating that a picture header is signalled in a slice header.

According to another aspect of the present invention, there is provided a method of decoding video data from a bitstream, the bitstream comprising video data corresponding to one or more slices, wherein the bitstream comprises a picture header comprising syntax elements to be used when decoding one or more slices, and a slice header comprising syntax elements to be used when decoding a slice, wherein a picture header is to be signalled in a slice header and wherein the parsing of information which may otherwise be signalled in a slice header and a picture header, in only one of the slice header or picture header are constrained; and the decoding comprises in case where a syntax element (xxx_info_in_ph_flag), indicates the absence of tool information in the picture header (e.g. when xxx_info_in_ph_flag=0), the picture header is not signalled in a slice header (e.g. force picture_header_in_slice_header_flag to be 0).

In a first further aspect of the invention, there is provided method of decoding video data from a bitstream, the bitstream comprising video data corresponding to one or more slices, wherein the bitstream comprises a picture header comprising syntax elements to be used when decoding one or more slices, and a slice header comprising syntax elements to be used when decoding a slice, and the decoding comprises, in a case where a picture header is to be signalled in a slice header, permitting parsing of information which may otherwise be signalled in a slice header and a picture header, in only one of the slice header or picture header; and decoding said bitstream using said syntax elements.

When the picture header is in the slice header this implies only one slice is present for the current picture. Thus, having the information transmitted or transmittable for both slice and picture doesn't increase the flexibility for encoder or decoder as the parameters will be the same. In other words, if the information is in the picture header, corresponding information in the slice header will be redundant. Similarly, if the information is in the slice header, corresponding information in the picture header will be redundant. By only permitting the information to be in the picture header or the slice header, in a case where the picture header is in the slice header, the decoder implementation may be simplified by limiting the redundancies in the signaling. Accordingly, the parsing may be simplified without any loss in coding efficiency.

The decoding may further comprise parsing a first syntax element indicating whether a picture header is to be signalled in a slice header and permitting the parsing of the information which may be signalled in a slice header and a picture header in only one of the slice header or picture header based on the first syntax element. The first syntax element may be a picture header in slice header flag.

Optionally, the parsing of the information in the slice header is not permitted in the case that the first syntax element indicates that the picture header is signalled in the slice header. A second syntax element may be parsed indicating whether the information is in a picture header or not, wherein it is a requirement of bitstream conformance that the second syntax element indicates that the information is signalled in the picture header in the case that the first syntax element indicates that the picture header is signalled in the slice header.

Alternatively, the signalling of the information in the picture header is not permitted in the case that the first syntax element indicates that the picture header is signalled in the slice header. The method may further comprise parsing a second syntax element indicating whether the information is in a picture header or not, wherein it is a requirement of bitstream conformance that the second syntax element indicates that the information is in the picture header in the case that the first syntax element indicates that the picture header is signalled in the slice header. The second syntax element may be an information in picture parameter set flag, wherein the information is in the picture header when the flag is set and the information is in the slice header or not present when not set.

According to embodiments, the information may include one or more of quantization parameter value information, reference picture list information, deblocking filter information, sample adaptive offset (SAO) information, weighted prediction information and adaptive loop filtering (ALF) information. For example, all of the quantization parameter value information, reference picture list information, deblocking filter information, sample adaptive offset (SAO) information, weighted prediction information and adaptive loop filtering (ALF) information.

Optionally, the information includes all information that may be signaled in a picture header and a slice header.

The reference picture list information may include one or more of the following syntax elements slice_collocated_from_l0 flag, a slice_collocated_ref_idx, a ph_collocated_from_l0_flag and a ph_collocated_ref_idx.

A number of weights for weighted prediction that may be parsed may be restricted in the case where a picture header is to be signalled in a slice header.

According to a second further aspect of the invention, there is provided a method of encoding video data into a bitstream, the video data corresponding to one or more slices, wherein the bitstream comprises a picture header comprising syntax elements to be used when decoding one or more slices, and a slice header comprising syntax elements to be used when decoding a slice, and the encoding comprises in a case where a picture header is to be signalled in a slice header, permitting encoding of information which may otherwise be signalled in a slice header and a picture header, in only one of the slice header or picture header, and encoding said video data using said syntax elements.

When the picture header is in the slice header this implies only one slice is present for the current picture. Thus, having the information transmitted or transmittable for both slice and picture doesn't increase the flexibility for encoder or decoder as the parameters will be the same. In other words, if the information is in the picture header, corresponding information in the slice header will be redundant. Similarly, if the information is in the slice header, corresponding information in the picture header will be redundant. By only permitting the information to be in the picture header or the slice header, in a case where the picture header is in the slice header, the decoder implementation may be simplified by limiting the redundancies in the signaling. Accordingly, the encoding may be simplified without any loss in coding efficiency and the signalling cost reduced (because the relevant information is only included once in the bitstream).

The encoding may further comprise encoding a first syntax element indicating whether a picture header is to be signalled in a slice header and permitting the encoding of the information which may be signalled in a slice header and a picture header in only one of the slice header or picture header based on the first syntax element.

The first syntax element may be a picture_header_in_slice_header_flag.

Encoding the information in the slice header may not be permitted in the case that the first syntax element indicates that the picture header is signalled in the slice header.

A second syntax element may be encoded indicating whether the information is in a picture header or not, wherein it is a requirement of bitstream conformance that the second syntax element indicates that the information is in the picture header in the case that the first syntax element indicates that the picture header is signalled in the slice header.

Alternatively, signalling of the information in the picture header is not permitted in the case that the first syntax element indicates that the picture header is signalled in the slice header.

A second syntax element may be encoded indicating whether the information is in a picture header or not, wherein it is a requirement of bitstream conformance that the second syntax element indicates that the information is in the picture header in the case that the first syntax element indicates that the picture header is signalled in the slice header.

The second syntax element may be an information in picture parameter set flag or an information in picture header flag, wherein the information is signalled in the picture header when the flag is set and the information is signalled in the slice header or not present when not set.

The information may include one or more of quantization parameter value information, reference picture list information, deblocking filter information, sample adaptive offset (SAO) information, weighted prediction information and adaptive loop filtering (ALF) information. Optionally, the information includes all information that may be signaled in a picture header and a slice header. For example, all of the quantization parameter value information, reference picture list information, deblocking filter information, sample adaptive offset (SAO) information, weighted prediction information and adaptive loop filtering (ALF) information.

The reference picture list information includes one or more of a slice_collocated_from_l0_flag, a slice_collocated_ref_idx, a ph_collocated_from_l0_flag and a ph_collocated_ref_idx.

Optionally, a number of weights for weighted prediction may be restricted in the case where a picture header is to be signalled in a slice header.

In a third further aspect according to the invention, there is provided a method of decoding a bitstream containing video data corresponding to one or more slices, wherein the bitstream comprises a picture header comprising syntax elements to be used when decoding one or more slices, and a slice header comprising syntax elements to be used when decoding a slice, and said method comprising parsing, in the slice header a syntax element indicating whether a picture header is signalled in a slice header, wherein ALF APS ID related syntax element is parsed prior to the syntax element indicating whether a picture header is signalled in a slice header. The ALF APS ID related information may be parsed near or at the beginning of the slice header.

In a fourth further aspect according to the invention there is provided a method of encoding a video data comprising one or more slices into a bitstream, wherein the bitstream comprises a picture header comprising syntax elements to be used when decoding one or more slices, and a slice header comprising syntax elements to be used when decoding a slice, and said method comprises parsing, in the slice header a syntax element indicating whether a picture header is signalled in a slice header; wherein ALF APS ID related syntax element is encoded prior to the syntax element indicating whether a picture header is signalled in a slice header. The ALF APS ID related information may be encoded near or at the beginning of the slice header.

In a fifth further aspect of the invention, there is provided a method of decoding video data from a bitstream, the bitstream comprising video data corresponding to one or more slices, wherein the bitstream comprises a picture header comprising syntax elements to be used when decoding one or more slices, and a slice header comprising syntax elements to be used when decoding a slice, and the decoding comprises, in a case where a picture header is to be signalled in a slice header, restricting a number of weights signalled for a weighted prediction mode; and decoding said bitstream using said syntax elements. In a case where a picture header is to be signalled in a slice header, parsing of information which may otherwise be signalled in a slice header and a picture header may be permitted in only one of the slice header or picture header.

In a sixth further aspect according to the invention, there is provided a method of encoding video data from a bitstream, the bitstream comprising video data corresponding to one or more slices, wherein the bitstream comprises a picture header comprising syntax elements to be used when decoding one or more slices, and a slice header comprising syntax elements to be used when decoding a slice, and the encoding comprises, in a case where a picture header is to be signalled in a slice header, restricting a number of weights encoded for a weighted prediction mode; and encoding said bitstream using said syntax elements. In a case where a picture header is to be signalled in a slice header, encoding of information which may otherwise be signalled in a slice header and a picture header, may be permitted in only one of the slice header or picture header.

According to a seventh further aspect of the invention, there is provided a decoder for decoding video data from a bitstream, the decoder being configured to perform the method of any of the first, third or fifth further aspects.

According to an eighth further aspect of the invention there is provided an encoder for encoding video data into a bitstream, the encoder being configured to perform the method of any of second, fourth or sixth further aspects.

According to a ninth further aspect of the invention, there is provided a computer program which upon execution causes the method of any of the first to sixth further aspects to be performed. The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet. Further features of the invention are characterised by the independent and dependent claims.

According to a first yet further aspect there is provided a method of decoding video data from a bitstream, the bitstream comprising video data corresponding to one or more slices, wherein the bitstream comprises a picture header comprising syntax elements to be used when decoding one or more slices, and a slice header comprising syntax elements to be used when decoding a slice, and the bitstream is constrained so that in a case where the bitstream includes a first syntax element having a value indicating that information which can be signalled in the picture header or in the slice header is signalled in the picture header, the bitstream also includes a second syntax element having a value indicating that the picture header is not in the slice header, the method comprising: decoding said bitstream using said syntax elements. The bitstream may be constrained for conformity with a video coding standard. In an embodiment, said video coding standard is the Versatile Video Coding standard. The second syntax element may be a picture header in slice header syntax element. The first syntax element may be a flag indicating the signalling in the picture header of one or more of quantization parameter value information, reference picture list information, deblocking filter information, sample adaptive offset (SAO) information, weighted prediction information and adaptive loop filtering (ALF) information. The bitstream constraint may be applied systematically. For example, in embodiments, the constraint is applied for any or all of sequences, pictures and slices in a bitstream.

According to a second yet further aspect, there is provided a method for encoding or decoding video data into or from a bitstream, said method comprising applying a constraint relating to whether a picture header is permitted in a slice header based on if information which can be signalled in the picture header or in the slice header is signalled in the picture header. According to a third yet further aspect, there is provided a device configured to perform the method of the second yet further aspect. According to a fourth yet further aspect, there is provided a computer program comprising instructions which upon execution cause the method of the second yet further aspect to be performed.

Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

BRIEF DESCRIPTION OF THE DRAWINGS

Reference will now be made, by way of example, to the accompanying drawings, in which.

DETAILED DESCRIPTION

Figure 1:
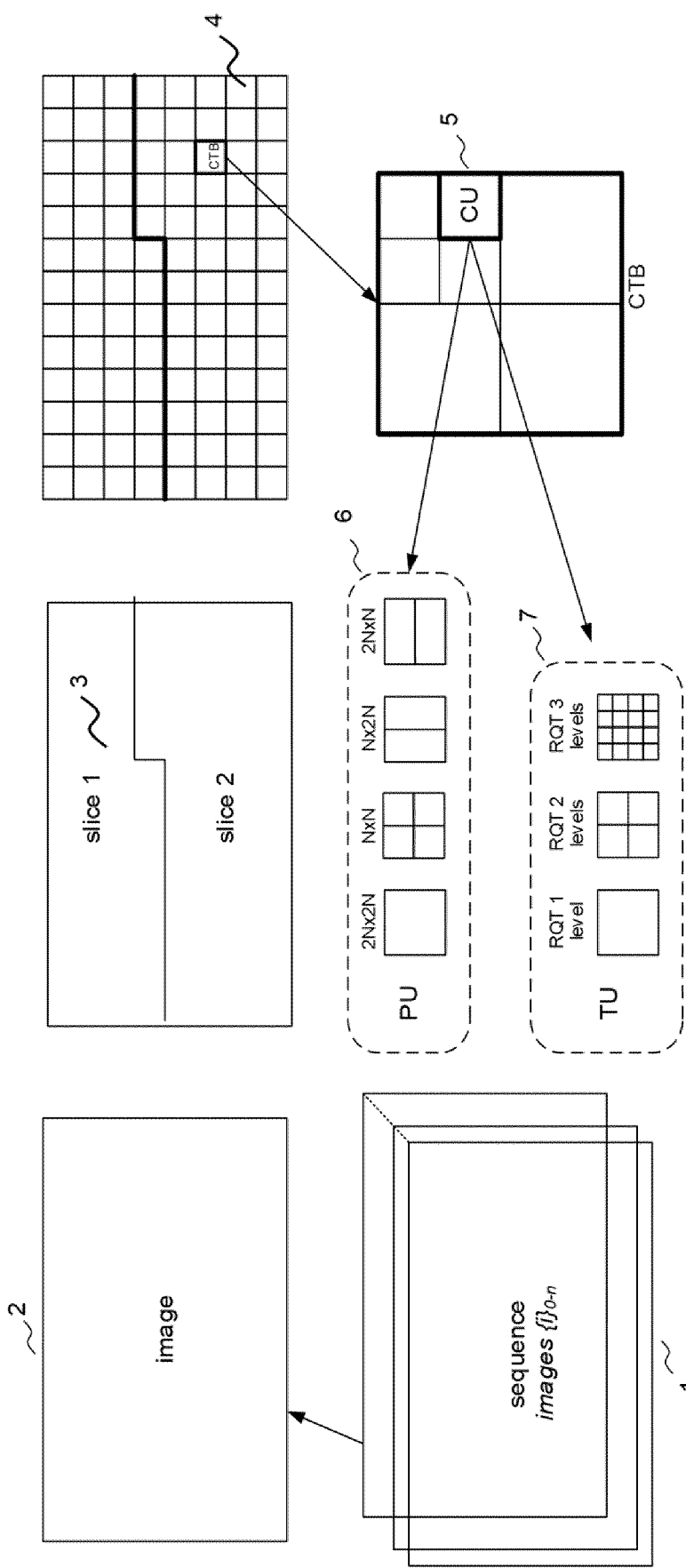
FIG. 1 is a diagram for use in explaining a coding structure used in HEVC and VVC.

FIG. 1 relates to a coding structure used in the High Efficiency Video Coding (HEVC) video standard. A video sequence 1 is made up of a succession of digital images i. Each such digital image is represented by one or more matrices. The matrix coefficients represent pixels.

An image 2 of the sequence may be divided into slices 3. A slice may in some instances constitute an entire image. These slices are divided into non-overlapping Coding Tree Units (CTUs). A Coding Tree Unit (CTU) is the basic processing unit of the High Efficiency Video Coding (HEVC) video standard and conceptually corresponds in structure to macroblock units that were used in several previous video standards. A CTU is also sometimes referred to as a Largest Coding Unit (LCU). A CTU has luma and chroma component parts, each of which component parts is called a Coding Tree Block (CTB). These different color components are not shown in FIG. 1.

A CTU is generally of size 64 pixels×64 pixels. Each CTU may in turn be iteratively divided into smaller variable-size Coding Units (CUs) 5 using a quadtree decomposition.

Coding units are the elementary coding elements and are constituted by two kinds of sub-unit called a Prediction Unit (PU) and a Transform Unit (TU). The maximum size of a PU or TU is equal to the CU size. A Prediction Unit corresponds to the partition of the CU for prediction of pixels values. Various different partitions of a CU into PUs are possible as shown by 606 including a partition into 4 square PUs and two different partitions into 2 rectangular PUs. A Transform Unit is an elementary unit that is subjected to spatial transformation using DCT. A CU can be partitioned into TUs based on a quadtree representation 607.

Each slice is embedded in one Network Abstraction Layer (NAL) unit. In addition, the coding parameters of the video sequence are stored in dedicated NAL units called parameter sets. In HEVC and H.264/AVC two kinds of parameter sets NAL units are employed: first, a Sequence Parameter Set (SPS) NAL unit that gathers all parameters that are unchanged during the whole video sequence. Typically, it handles the coding profile, the size of the video frames and other parameters. Secondly, a Picture Parameter Set (PPS) NAL unit includes parameters that may change from one image (or frame) to another of a sequence. HEVC also includes a Video Parameter Set (VPS) NAL unit which contains parameters describing the overall structure of the bitstream. The VPS is a new type of parameter set defined in HEVC, and applies to all of the layers of a bitstream. A layer may contain multiple temporal sub-layers, and all version 1 bitstreams are restricted to a single layer. HEVC has certain layered extensions for scalability and multiview and these will enable multiple layers, with a backwards compatible version 1 base layer.

Figure 2:
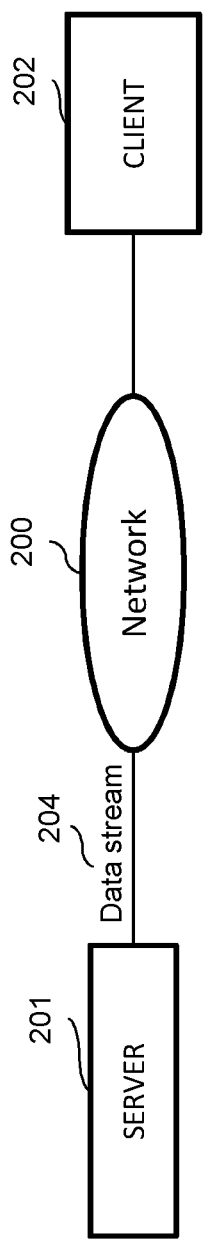
FIG. 2 is a block diagram schematically illustrating a data communication system in which one or more embodiments of the invention may be implemented.

FIG. 2 illustrates a data communication system in which one or more embodiments of the invention may be implemented. The data communication system comprises a transmission device, in this case a server 201, which is operable to transmit data packets of a data stream to a receiving device, in this case a client terminal 202, via a data communication network 200. The data communication network 200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 201 sends the same data content to multiple clients.

The data stream 204 provided by the server 201 may be composed of multimedia data representing video and audio data. Audio and video data streams may, in some embodiments of the invention, be captured by the server 201 using a microphone and a camera respectively. In some embodiments data streams may be stored on the server 201 or received by the server 201 from another data provider, or generated at the server 201. The server 201 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format.

The client 202 receives the transmitted bitstream and decodes the reconstructed bitstream to reproduce video images on a display device and the audio data by a loud speaker.

Although a streaming scenario is considered in the example of FIG. 2, it will be appreciated that in some embodiments of the invention the data communication between an encoder and a decoder may be performed using for example a media storage device such as an optical disc.

In one or more embodiments of the invention a video image is transmitted with data representative of compensation offsets for application to reconstructed pixels of the image to provide filtered pixels in a final image.

Figure 3:
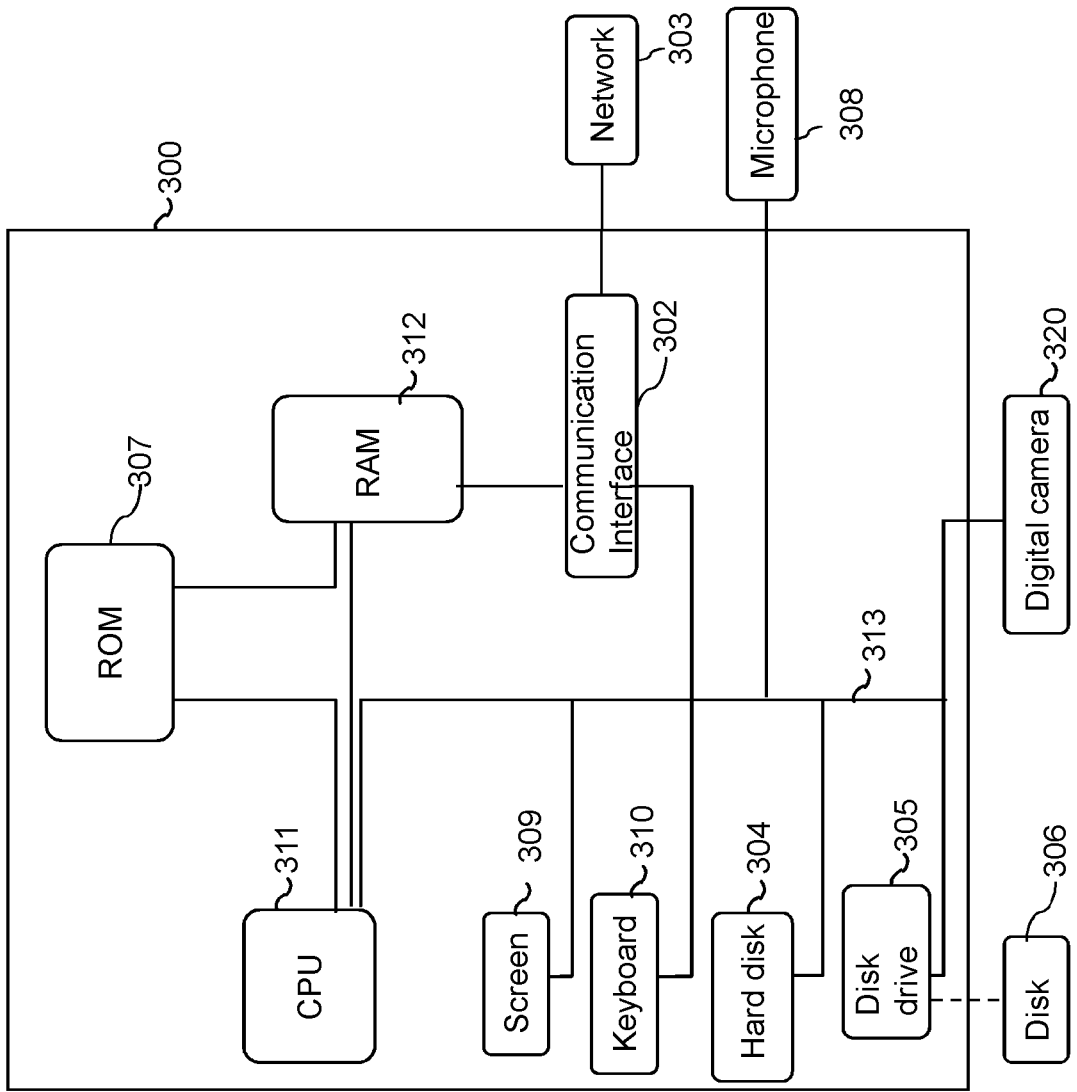
FIG. 3 is a block diagram illustrating components of a processing device in which one or more embodiments of the invention may be implemented.

FIG. 3 schematically illustrates a processing device 300 configured to implement at least one embodiment of the present invention. The processing device 300 may be a device such as a micro-computer, a workstation or a light portable device. The device 300 comprises a communication bus 313 connected to:

- a central processing unit 311, such as a microprocessor, denoted CPU;
- a read only memory 306, denoted ROM, for storing computer programs for implementing the invention;
- a random access memory 312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and
- a communication interface 302 connected to a communication network 303 over which digital data to be processed are transmitted or received Optionally, the apparatus 300 may also include the following components:

- a data storage means 304 such as a hard disk, for storing computer programs for implementing methods of one or more embodiments of the invention and data used or produced during the implementation of one or more embodiments of the invention;
- a disk drive 305 for a disk 306, the disk drive being adapted to read data from the disk 306 or to write data onto said disk;
- a screen 309 for displaying data and/or serving as a graphical interface with the user, by means of a keyboard 310 or any other pointing means.

The apparatus 300 can be connected to various peripherals, such as for example a digital camera 320 or a microphone 308, each being connected to an input/output card (not shown) so as to supply multimedia data to the apparatus 300.

The communication bus provides communication and interoperability between the various elements included in the apparatus 300 or connected to it. The representation of the bus is not limiting and in particular the central processing unit is operable to communicate instructions to any element of the apparatus 300 directly or by means of another element of the apparatus 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 306, on the hard disk 304 or on a removable digital medium such as for example a disk 306 as described previously. According to a variant, the executable code of the programs can be received by means of the communication network 303, via the interface 302, in order to be stored in one of the storage means of the apparatus 300 before being executed, such as the hard disk 304.

The central processing unit 311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 304 or in the read only memory 306, are transferred into the random access memory 312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
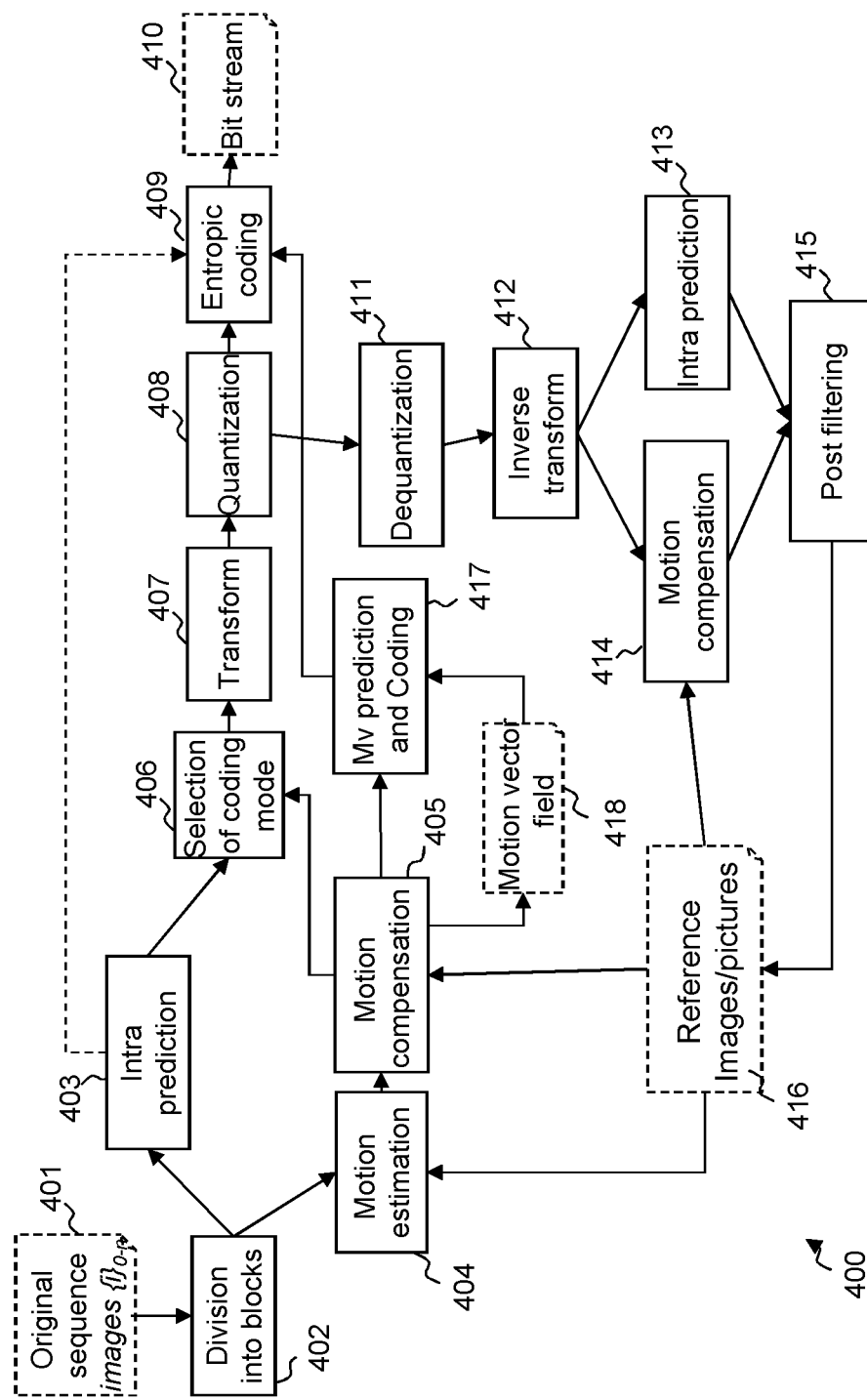
FIG. 4 is a flow chart illustrating steps of an encoding method according to embodiments of the invention.

FIG. 4 illustrates a block diagram of an encoder according to at least one embodiment of the invention. The encoder is represented by connected modules, each module being adapted to implement, for example in the form of programming instructions to be executed by the CPU 311 of device 300, at least one corresponding step of a method implementing at least one embodiment of encoding an image of a sequence of images according to one or more embodiments of the invention.

An original sequence of digital images i0 to in 401 is received as an input by the encoder 400. Each digital image is represented by a set of samples, known as pixels.

A bitstream 410 is output by the encoder 400 after implementation of the encoding process. The bitstream 410 comprises a plurality of encoding units or slices, each slice comprising a slice header for transmitting encoding values of encoding parameters used to encode the slice and a slice body, comprising encoded video data.

The input digital images i0 to in 401 are divided into blocks of pixels by module 402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 403 implements an Intra prediction process, in which the given block to be encoded is predicted by a predictor computed from pixels of the neighbourhood of said block to be encoded. An indication of the selected Intra predictor and the difference between the given block and its predictor is encoded to provide a residual if the Intra coding is selected.

Temporal prediction is implemented by motion estimation module 404 and motion compensation module 405. Firstly, a reference image from among a set of reference images 416 is selected, and a portion of the reference image, also called reference area or image portion, which is the closest area to the given block to be encoded, is selected by the motion estimation module 404. Motion compensation module 405 then predicts the block to be encoded using the selected area. The difference between the selected reference area and the given block, also called a residual block, is computed by the motion compensation module 405. The selected reference area is indicated by a motion vector.

Thus, in both cases (spatial and temporal prediction), a residual is computed by subtracting the prediction from the original block.

In the INTRA prediction implemented by module 403, a prediction direction is encoded. In the temporal prediction, at least one motion vector is encoded. In the Inter prediction implemented by modules 404, 405, 416, 418, 417, at least one motion vector or data for identifying such motion vector is encoded for the temporal prediction.

Information relative to the motion vector and the residual block is encoded if the Inter prediction is selected. To further reduce the bitrate, assuming that motion is homogeneous, the motion vector is encoded by difference with respect to a motion vector predictor. Motion vector predictors of a set of motion information predictors is obtained from the motion vectors field 418 by a motion vector prediction and coding module 417.

The encoder 400 further comprises a selection module 406 for selection of the coding mode by applying an encoding cost criterion, such as a rate-distortion criterion. In order to further reduce redundancies a transform (such as DCT) is applied by transform module 407 to the residual block, the transformed data obtained is then quantized by quantization module 408 and entropy encoded by entropy encoding module 409. Finally, the encoded residual block of the current block being encoded is inserted into the bitstream 410.

The encoder 400 also performs decoding of the encoded image in order to produce a reference image for the motion estimation of the subsequent images. This enables the encoder and the decoder receiving the bitstream to have the same reference frames. The inverse quantization module 411 performs inverse quantization of the quantized data, followed by an inverse transform by reverse transform module 412. The reverse intra prediction module 413 uses the prediction information to determine which predictor to use for a given block and the reverse motion compensation module 414 actually adds the residual obtained by module 412 to the reference area obtained from the set of reference images 416.

Figure 5:
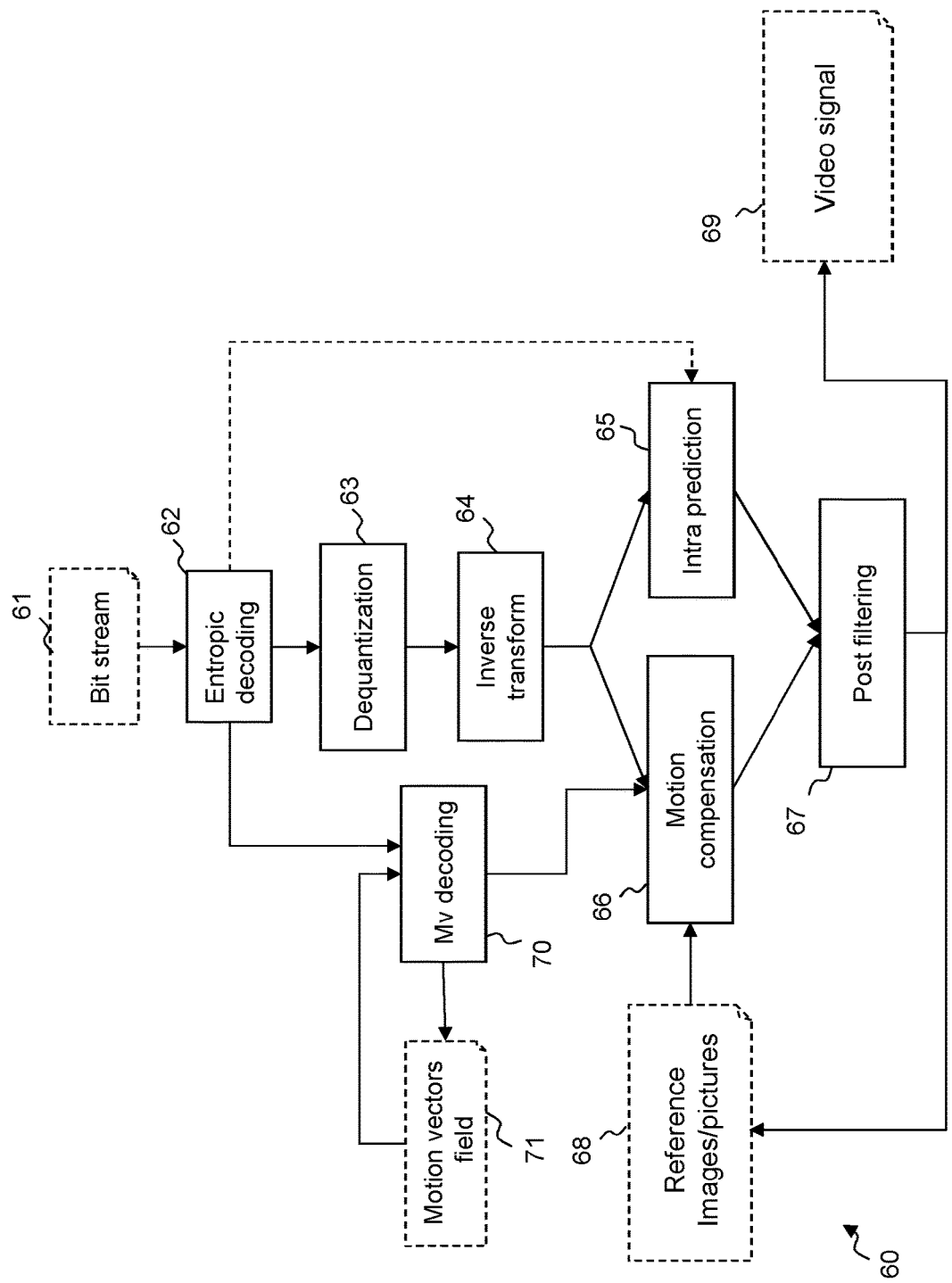
FIG. 5 is a flow chart illustrating steps of a decoding method according to embodiments of the invention.

Post filtering is then applied by module 415 to filter the reconstructed frame of pixels. In the embodiments of the invention an SAO loop filter is used in which compensation offsets are added to the pixel values of the reconstructed pixels of the reconstructed image FIG. 5 illustrates a block diagram of a decoder 60 which may be used to receive data from an encoder according an embodiment of the invention. The decoder is represented by connected modules, each module being adapted to implement, for example in the form of programming instructions to be executed by the CPU 311 of device 300, a corresponding step of a method implemented by the decoder 60.

The decoder 60 receives a bitstream 61 comprising encoding units, each one being composed of a header containing information on encoding parameters and a body containing the encoded video data. The structure of the bitstream in VVC is described in more detail below with reference to FIG. 6. As explained with respect to FIG. 4, the encoded video data is entropy encoded, and the motion vector predictors' indexes are encoded, for a given block, on a predetermined number of bits. The received encoded video data is entropy decoded by module 62. The residual data are then dequantized by module 63 and then a reverse transform is applied by module 64 to obtain pixel values.

The mode data indicating the coding mode are also entropy decoded and based on the mode, an INTRA type decoding or an INTER type decoding is performed on the encoded blocks of image data.

In the case of INTRA mode, an INTRA predictor is determined by intra reverse prediction module 65 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 70.

Motion vector decoding module 70 applies motion vector decoding for each current block encoded by motion prediction. Once an index of the motion vector predictor, for the current block has been obtained the actual value of the motion vector associated with the current block can be decoded and used to apply reverse motion compensation by module 66. The reference image portion indicated by the decoded motion vector is extracted from a reference image 68 to apply the reverse motion compensation 66. The motion vector field data 71 is updated with the decoded motion vector in order to be used for the inverse prediction of subsequent decoded motion vectors.

Finally, a decoded block is obtained. Post filtering is applied by post filtering module 67. A decoded video signal 69 is finally provided by the decoder 60.

Figure 6:
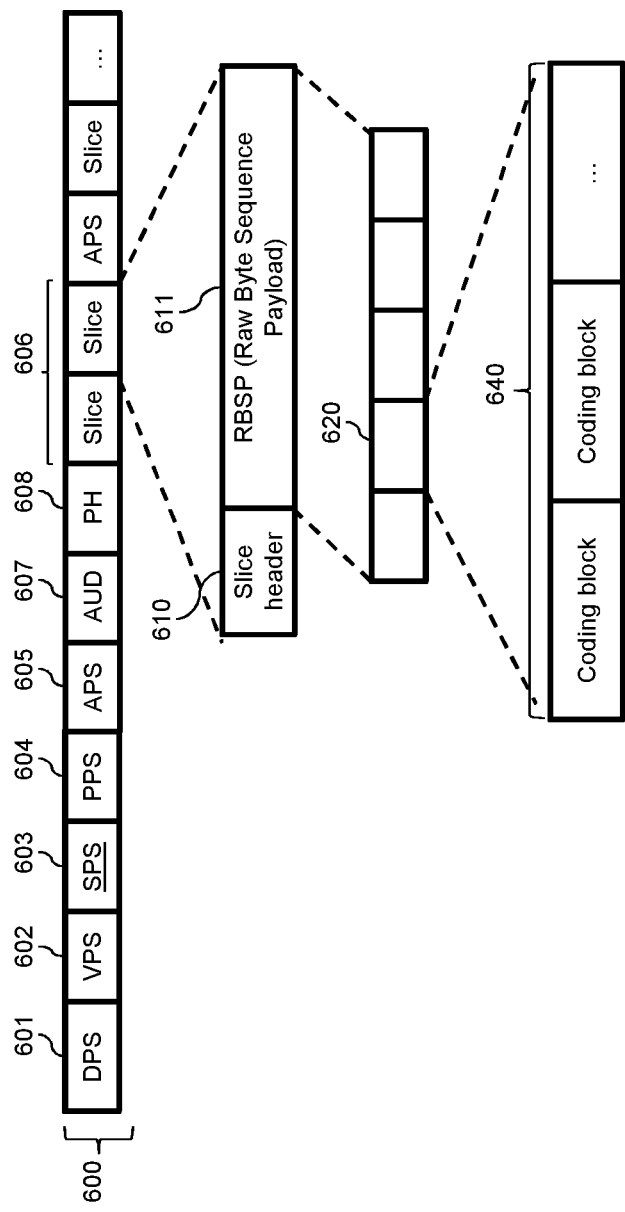
FIG. 6 illustrates the structure of the bitstream in the exemplary coding system VVC

FIG. 6 illustrates the organisation of the bitstream in the exemplary coding system VVC as describe in JVET-Q2001-vD.

A bitstream 61 according to the VVC coding system is composed of an ordered sequence of syntax elements and coded data. The syntax elements and coded data are placed into Network Abstraction Layer (NAL) units 601-608. There are different NAL unit types. The network abstraction layer provides the ability to encapsulate the bitstream into different protocols, like RTP/IP, standing for Real Time Protocol/Internet Protocol, ISO Base Media File Format, etc. The network abstraction layer also provides a framework for packet loss resilience.

NAL units are divided into Video Coding Layer (VCL) NAL units and non-VCL NAL units. The VCL NAL units contain the actual encoded video data. The non-VCL NAL units contain additional information. This additional information may be parameters needed for the decoding of the encoded video data or supplemental data that may enhance usability of the decoded video data. NAL units 606 correspond to slices and constitute the VCL NAL units of the bitstream.

Different NAL units 601-605 correspond to different parameter sets, these NAL units are non-VCL NAL units. The Decoder Parameter Set (DPS) NAL unit 301 contains parameters that are constant for a given decoding process. The Video Parameter Set (VPS) NAL unit 602 contains parameters defined for the whole video, and thus the whole bitstream. The DPS NAL unit may define parameters more static than the parameters in the VPS. In other words, the parameters of DPS change less frequently than the parameter of the VPS.

The Sequence Parameter Set (SPS) NAL unit 603 contains parameters defined for a video sequence. In particular, the SPS NAL unit may define the sub pictures layout and associated parameters of the video sequences. The parameters associated to each subpicture specifies the coding constraints applied to the subpicture. In particular, it comprises a flag indicating that the temporal prediction between subpictures is restricted to the data coming from the same subpicture. Another flag may enable or disable the loop filters across the subpicture boundaries.

The Picture Parameter Set (PPS) NAL unit 604, PPS contains parameters defined for a picture or a group of pictures. The Adaptation Parameter Set (APS) NAL unit 605, contains parameters for loop filters typically the Adaptive Loop Filter (ALF) or the reshaper model (or luma mapping with chroma scaling (LMCS) model) or the scaling matrices that are used at the slice level.

The syntax of the PPS as proposed in the current version of VVC comprises syntax elements that specifies the size of the picture in luma samples and also the partitioning of each picture in tiles and slices.

The PPS contains syntax elements that make it possible to determine the slices location in a frame. Since a subpicture forms a rectangular region in the frame, it is possible to determine the set of slices, the parts of tiles or the tiles that belong to a subpicture from the Parameter Sets NAL units. The PPS as with the APS have an ID mechanism to limit the amount of same PPS's transmitted.

The main difference between the PPS and Picture Header is it transmission, the PPS is generally transmitted for a group of pictures compared to the PH which is systematically transmitted for each Picture. Accordingly, the PPS compared to the PH contains parameters which can be constant for several picture.

The bitstream may also contain Supplemental Enhancement Information (SEI) NAL units (not represented in FIG. 6). The periodicity of occurrence of these parameter sets in the bitstream is variable. A VPS that is defined for the whole bitstream may occur only once in the bitstream. To the contrary, an APS that is defined for a slice may occur once for each slice in each picture. Actually, different slices may rely on the same APS and thus there are generally fewer APS than slices in each picture. In particular, the APS is defined in the picture header. Yet, the ALF APS can be refined in the slice header.

The Access Unit Delimiter (AUD) NAL unit 607 separates two access units. An access unit is a set of NAL units which may comprise one or more coded pictures with the same decoding timestamp. This optional NAL unit contains only one syntax element in current VVC specification: pic_type, this syntax element. indicates that the slice_type values for all slices of the coded pictures in the AU. If pic_type is set equal to 0, the AU contain only Intra slice. If equal to 1, it contains P and I slices. If equal to 2 it contains B, P or Intra slice This NAL unit contains only one syntax element the pic-type.

TABLE 1

Syntax AUD

| | Descriptor |
|---|---|
| access_unit_delimiter_rbsp( ) { | |
|   pic_type | u(3) |
|   rbsp_trailing_bits( ) | |
| } | |

In JVET-Q2001-vD the pic_type is defined as follow:

"pic_type indicates that the slice_type values for all slices of the coded pictures in the AU containing the AU delimiter NAL unit are members of the set listed in Table 2 for the given value of pic_type. The value of pic_type shall be equal to 0, 1 or 2 in bitstreams conforming to this version of this Specification. Other values of pic_type are reserved for future use by ITU-T|ISO/IEC. Decoders conforming to this version of this Specification shall ignore reserved values of pic_type."

The rbsp_trailing_bits( ) is a function which adds bits in order to be aligned to the end of a byte. So after, this function, the amount of bitstream parsed is an integer number of bytes.

TABLE 2

Interpretation of pic_type

| pic_type | slice_type values that may be present in the AU |
|---|---|
| 0 | I |
| 1 | P, I |
| 2 | B, P, I |

The PH NAL unit 608 is the Picture Header NAL unit which groups parameters common to a set of slices of one coded picture. The picture may refer to one or more APS to indicate the AFL parameters, reshaper model and the scaling matrices used by the slices of the Picture.

Each of the VCL NAL units 606 contains a slice. A slice may correspond to the whole picture or sub picture, a single tile or a plurality of tiles or a fraction of a tile. For example the slice of the FIG. 3 contains several tiles 620. A slice is composed of a slice header 610 and a raw byte sequence payload, RBSP 611 that contains the coded pixels data encoded as coded blocks 640.

The syntax of the PPS as proposed in the current version of VVC comprises syntax elements that specifies the size of the picture in luma samples and also the partitioning of each picture in tiles and slices.

The PPS contains syntax elements that make it possible to determine the slices location in a frame. Since a subpicture forms a rectangular region in the frame, it is possible to determine the set of slices, the parts of tiles or the tiles that belong to a subpicture from the Parameter Sets NAL units.
NAL Unit Slice The NAL unit slice layer contains the slice header and the slice data as illustrated in Table 3.

TABLE 3

Slice layer syntax

| | Descriptor |
|---|---|
| slice_layer_rbsp( ) { | |
|   slice_header( ) | |
|   slice_data( ) | |
|   rbsp_slice_trailing_bits( ) | |
| } | |

APS

The Adaptation Parameter Set (APS) NAL unit 605, is defined in Table 4 showing the syntax elements.

As depicted in table Table 4, there are 3 possible types of APS given by the aps_params_type syntax element:
ALF_AP: for the ALF parameters
LMCS_APS for the LMCS parameters
SCALING_APS for Scaling list relative parameters

TABLE 4

Adaptation parameter set syntax

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data( ) | |
|   else if( aps_params_type = = LMCS_APS ) | |
|     lmcs_data( ) | |
|   else if( aps_params_type = = SCALING_APS ) | |
|     scaling_list_data( ) | |

TABLE 4-continued

| Adaptation parameter set syntax | Descriptor |
| --- | --- |
| aps_extension_flag | u(1) |
| if( aps_extension_flag ) | |
|    while( more_rbsp_data( ) ) | |
|       aps_extension_data_flag | u(1) |
| rbsp_trailing_bits( ) | |
| } | |

These three types of APS parameters are discussed in turn below

ALF APS

The ALF parameters are described in Adaptive loop filter data syntax elements (Table 5). First, four flags are dedicated to specify whether or not the ALF filters are transmitted for Luma and/or for Chroma and if the CC-ALF (Cross Component Adaptive Loop Filtering) is enabled for Cb component and Cr component. If the Luma filter flag is enabled, another flag is decoded to know if the clip values are signalled (alf_luma_clip_flag). Then the number of filters signalled is decoded using the alf_luma_num_filters_signalled_minus1 syntax element. If needed, the syntax element representing the ALF coefficients delta "alf_luma_coeff_delta_idx" is decoded for each enabled filter. Then absolute value and the sign for each coefficient of each filter are decoded.

If the alf_luma_clip_flag is enabled, the clip index for each coefficient of each enabled filter is decoded.

In the same way, the ALF chroma coefficients are decoded if needed.

If CC-ALF is enabled for Cr or Cb the number of filter are decoded (alf_cc_cb_filters_signalled_minus1 or alf_cc_cr_filters_signalled_minus1) and the related coefficients are decoded (alf_cc_cb_mapped_coeff_abs and alf_cc_cb_coeff_sign or respectively alf_cc_cr_mapped_coeff_abs and alf_cc_cr_coeff_sign)

TABLE 5

| Adaptive loop filter data syntax | Descriptor |
| --- | --- |
| alf_data( ) { | |
|   alf_luma_filter_signal_flag | u(1) |
|   alf_chroma_filter_signal_flag | u(1) |
|   alf_cc_cb_filter_signal_flag | u(1) |
|   alf_cc_cr_filter_signal_flag | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) | |
|       for( filtIdx = 0; filtIdx < NumAlfFilters; filtIdx++ ) | |
|         alf_luma_coeff_delta_idx[ filtIdx ] | u(v) |
|     for( sfIdx = 0; sfIdx <= alf_luma_num_filters_signalled_minus1; sfIdx++ ) | |
|       for( j = 0; j < 12; j++ ) { | |
|         alf_luma_coeff_abs[ sfIdx ][ j ] | ue(v) |
|         if( alf_luma_coeff_abs[ sfIdx ][ j ] ) | |
|           alf_luma_coeff_sign[ sfIdx ][ j ] | u(1) |
|       } | |
|     if( alf_luma_clip_flag ) | |
|       for( sfIdx = 0; sfIdx <= alf_luma_num_filters_signalled_minus1; sfIdx++ ) | |
|         for( j = 0; j < 12; j++ ) | |
|           alf_luma_clip_idx[ sfIdx ][ j ] | u(2) |
|   } | |
|   if( alf_chroma_filter_signal_flag ) { | |
|     alf_chroma_clip_flag | u(1) |
|     alf_chroma_num_alt_filters_minus1 | ue(v) |
|     for( altIdx = 0; altIdx <= alf_chroma_num_alt_filters_minus1; altIdx++ ) { | |
|       for( j = 0; j < 6; j++ ) { | |
|         alf_chroma_coeff_abs[ altIdx ][ j ] | ue(v) |
|         if( alf_chroma_coeff_abs[ altIdx ][ j ] > 0 ) | |
|           alf_chroma_coeff_sign[ altIdx ][ j ] | u(1) |
|       } | |
|       if( alf_chroma_clip_flag ) | |
|         for( j = 0; j < 6; j++ ) | |
|           alf_chroma_clip_idx[altIdx][ j ] | u(2) |
|     } | |
|   } | |
|   if( alf_cc_cb_filter_signal_flag ) { | |
|     alf_cc_cb_filters_signalled_minus1 | ue(v) |
|     for( k = 0; k < alf_cc_cb_filters_signalled_minus1 + 1; k++ ) { | |
|       for( j = 0; j < 7; j++ ) { | |
|         alf_cc_cb_mapped_coeff_abs[ k ][ j ] | u(3) |
|         if( alf_cc_cb_mapped_coeff_abs[ k ][ j ] ) | |
|           alf_cc_cb_coeff_sign[ k ] [ j ] | u(1) |
|       } | |
|     } | |
|   } | |
|   if( alf_cc_cr_filter_signal_flag ) { | |
|     alf_cc_cr_filters_signalled_minus1 | ue(v) |
|     for( k = 0; k < alf_cc_cr_filters_signalled_minus1 + 1; k++ ) { | |
|       for( j = 0; j < 7; j++ ) { | |

TABLE 5-continued

| Adaptive loop filter data syntax | Descriptor |
|---|---|
|       alf_cc_cr_mapped_coeff_abs[ k ][ j ] | u(3) |
|       if( alf_cc_cr_mapped_coeff_abs[ k ][ j ] ) | |
|         alf_cc_cr_coeff_sign[ k ][ j ] | u(1) |
|       } | |
|     } | |
|   } | |
| } | |

LMCS Syntax Elements for Both Luma Mapping and Chroma Scaling

The Table 6 below gives all the LMCS syntax elements which are coded in the adaptation parameter set (APS) syntax structure when the aps_params_type parameter is set to 1 (LMCS_APS). Up to four LMCS APS's can be used in a coded video sequence, however, only a single LMCS APS can be used for a given picture.

These parameters are used to build the forward and inverse mapping functions for Luma and the scaling function for Chroma.

TABLE 6

| Luma mapping with chroma scaling data syntax | Descriptor |
|---|---|
| lmcs_data ( ) { | |
|   lmcs_min_bin_idx | ue(v) |
|   lmcs_delta_max_bin_idx | ue(v) |
|   lmcs_delta_cw_prec_minus1 | ue(v) |
|   for( i = lmcs_min_bin_idx; i <= LmcsMaxBinIdx; i++ ) { | |
|     lmcs_delta_abs_cw[ i ] | u(v) |
|     if( lmcs_delta_abs_cw[ i ] ) > 0 ) | |

TABLE 6-continued

| Luma mapping with chroma scaling data syntax | Descriptor |
|---|---|
|       lmcs_delta_sign_cw_flag[ i ] | u(1) |
|   } | |
|   lmcs_delta_abs_crs | u(3) |
|   if( lmcs_delta_abs_crs ) > 0 ) | |
|     lmcs_delta_sign_crs_flag | u(1) |
| } | |

Scaling List APS

The scaling list offers the possibility to update the quantization matrix used for quantification. In VVC this scaling matrix is signalled in the APS as described in Scaling list data syntax elements (Table 7 Scaling list data syntax). The first syntax element specifies if the scaling matrix is used for the LFNST (Low Frequency Non-Separable Transform) tool based on the flag scaling_matrix_for_lfist_disabled_flag. The second one is specified if the scaling list are used for Chroma components (scaling_list_chroma_present_flag). Then the syntax elements needed to build the scaling matrix are decoded (scaling_list_copy_mode_flag, scaling_list_pred_mode_flag, scaling_list_pred_id_delta, scaling_list_dc_coef, scaling_list_delta_coef).

TABLE 7

| Scaling list data syntax | Descriptor |
|---|---|
| scaling_list_data( ) { | |
|   scaling_matrix_for_lfnst_disabled_flag | u(1) |
|   scaling_list_chroma_present_flag | u(1) |
|   for( id = 0; id < 28; id ++ ) | |
|     matrixSize = (id < 2 ) ? 2 : ( ( id < 8 ) ? 4 : 8 ) | |
|     if( scaling_list_chroma_present_flag \|\| ( id % 3 = = 2 ) \|\| ( id = = 27 ) ) { | |
|       scaling_list_copy_mode_flag[ id ] | u(1) |
|       if( !scaling_list_copy_mode_flag[ id ] ) | |
|         scaling_list_pred_mode_flag[ id ] | u(1) |
|       if( ( scaling_list_copy_mode_flag[ id ] \|\| scaling_list_pred_mode_flag[ id ] ) && id != 0 && id != 2 && id != 8 ) | |
|         scaling_list_pred_id_delta[ id ] | ue(v) |
|       if( !scaling_list_copy_mode_flag[ id ] ) { | |
|         nextCoef = 0 | |
|         if( id > 13 ) { | |
|           scaling_list_dc_coef[ id − 14 ] | se(v) |
|           nextCoef += scaling_list_dc_coef[ id − 14 ] | |
|         } | |
|         for( i = 0; i < matrixSize * matrixSize; i++ ) { | |
|           x = DiagScanOrder[ 3 ][ 3 ][ i ][ 0 ] | |
|           y = DiagScanOrder[ 3 ][ 3 ][ i ][ 1 ] | |
|           if( !( id > 25 && x >= 4 && y >= 4 ) ) { | |

TABLE 7-continued

Scaling list data syntax

| | Descriptor |
|---|---|
|       scaling_list_delta_coef[ id ][ i ]<br>      nextCoef += scaling_list_delta_coef[ id ][ i ]<br>    }<br>    ScalingList[ id ][ i ] = nextCoef<br>   }<br>  }<br> }<br>} | se(v) |

Picture Header

The picture header is transmitted at the beginning of each picture before the other Slice Data. This is very large compared to the previous headers in the previous drafts of the standard. A complete description of all these parameters can be found in JVET-Q2001-vD. Table 9 shows these parameters in the current picture header decoding syntax. The related syntax elements which can be decoded are related to:
- the usage of this picture, reference frame or not
- The type of picture
- output frame
- The number of the Picture
- subpicture usage if needed
- reference picture lists if needed
- colour plane if needed
- partitioning update if overriding flag is enabled
- delta QP parameters if needed
- Motion information parameters if needed
- ALF parameters if needed
- SAO parameters if needed
- quantification parameters if needed
- LMCS parameters if needed
- Scaling list parameters if needed
- picture header extension if needed
- Etc. . . . .

Picture "Type"

The first flag is the gdr_or_irap_pic_flag which indicates if the current picture is a resynchronisation picture (IRAP or GDR). If this flag is true, the gdr_pic_flag is decoded to know if the current picture is an IRAP or a GDR picture.

Then the ph_inter_slice_allowed_flag is decoded to identify that the Inter slice is allowed.

When they are allowed, the flag ph_intra_slice_allowed_flag is decoded to know if the Intra slice are allowed for the current picture.

Then the non_reference_picture_flag, the ph_pic_parameter_set_id indicating the PPS ID and the picture order count ph_pic_order_cnt_lsb are decoded. The picture order count gives the number of the current picture.

If the picture is a GDR or an IRAP picture, the flag no_output_of_prior_pics_flag is decoded.

And if the picture is a GDR the recovery_poc_cnt is decoded. Then ph_poc_msb_present_flag and poc_msb_val are decoded if needed.

ALF

After these parameters describing important information on the current picture, the set of ALF APS id syntax elements are decoded if ALF is enabled at SPS level and if ALF is enabled at picture header level. ALF is enabled at SPS level thanks to the sps_alf_enabled_flag flag. And ALF signalling is enabled at picture header level thanks to the alf_info_in_ph_flag equal to 1 otherwise (alf_info_in_ph_flag equal to 0) ALF is signalled at slice level.

The alf_info_in_ph_flag is defined as the following:

"alf_info_in_ph_flag equal to 1 specifies that ALF information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure."

First the ph_alf_enabled_present_flag is decoded to determine whether or not if the ph_alf_enabled_flag should be decoded. If the ph_alf_enabled_flag is enabled, ALF is enabled for all slices of the current picture.

If ALF is enabled, the amount of ALF APS id for luma is decoded using the pic_num_alf_aps_ids_luma syntax element. For each APS id, the APS id value for luma is decoded "ph_alf_aps_id_luma".

For chroma the syntax element, ph_alf_chroma_idc is decoded to determine whether or not ALF is enabled for Chroma, for Cr only, or for Cb only. If it is enabled, the value of the APS ID for Chroma is decoded using the ph_alf_aps_id_chroma syntax element.

In the way the APS ID for CC-ALF method are decoded if needed for Cb and/or CR components

LMCS

The set of LMCS APS ID syntax elements is then decoded if LMCS was enabled at SPS level. First the ph_lmcs_enabled_flag is decoded to determine whether or not LMCS is enabled for the current picture. If LMCS is enabled, the ID value is decoded ph_lmcs_aps_id. For Chroma only the ph_chroma_residual_scale_flag is decoded to enable or disable the method for Chroma.

Scaling List

The set of scaling list APS ID is then decoded if the scaling list is enabled at SPS level. The ph_scaling_list_present_flag is decoded to determine whether or not the scaling matrix is enabled for the current picture. And the value of the APS ID, ph_scaling_list_aps_id, is then decoded.

Subpicture

The Subpicture parameters are enabled when they are enabled at SPS and if the subpicture id signalling is disabled. It also contains some information on virtual boundaries. For the sub picture parameters eight syntax elements are defined:

ph_virtual_boundaries_present_flag
ph_num_ver_virtual_boundaries
ph_virtual_boundaries_pos_x[i]
ph_num_hor_virtual_boundaries
ph_virtual_boundaries_pos_y[i]

Output Flag

These subpicture parameters are followed by the pic_output_flag if present.

Reference Picture Lists

If the reference picture lists are signalled in the picture header (thanks to rpl_info_in_ph_flag equal to 1), then the parameters for the reference picture lists are decoded ref_pic_lists( ) it contains the following syntax elements:

rpl_sps_flag[ ]
    rpl_idx[ ]
    poc_lsb_lt[ ][ ]
    delta_poc_msb_present_flag[ ][ ]
    delta_poc_msb_cycle_lt[ ][ ]

Partitioning

The set of partitioning parameters is decoded if needed and contains the following syntax elements:

partition_constraints_override_flag
    ph_log 2_diff_min_qt_min_cb_intra_slice_luma
    ph_max_mtt_hierarchy_depth_intra_slice_luma
    ph_log 2_diff_max_bt_min_qt_intra_slice_luma
    ph_log 2_diff_max_tt_min_qt_intra_slice_luma
    ph_log 2_diff_min_qt_min_cb_intra_slice_chroma
    ph_max_mtt_hierarchy_depth_intra_slice_chroma
    ph_log 2_diff_max_bt_min_qt_intra_slice_chroma
    ph_log 2_diff_max_tt_min_qt_intra_slice_chroma
    ph_log 2_diff_min_qt_min_cb_inter_slice
    ph_max_mtt_hierarchy_depth_inter_slice
    ph_log 2_diff_max_bt_min_qt_inter_slice
    ph_log 2_diff_max_tt_min_qt_inter_slice Weighted Prediction The weighted prediction parameters pred_weight_table( ) are decoded if the weighted prediction method is enabled at PPS level and if the weighted prediction parameters are signalled in the picture header (wp_info_in_ph_flag equal to 1).

The pred_weight_table( ) contains the weighted prediction parameters for List L0 and for list L1 when bi-prediction weighted prediction is enabled. When the weighted prediction parameters are transmitted in the picture header the number of weights for each list are explicitly transmitted as depicted in the pred_weight_table( ) syntax table Table 8.

TABLE 8

| Weighted prediction parameters syntax | Descriptor |
|---|---|
| pred_weight_table( ) { | |
|   luma_log2_weight_denom | ue(v) |
|   if( ChromaArrayType != 0 ) | |
|     delta_chroma_log2_weight_denom | se(v) |
|   if( wp_info_in_ph_flag ) | |
|     num_l0_weights | ue(v) |
|   for( i = 0; i < NumWeightsL0; i++ ) | |
|     luma_weight_l0_flag[ i ] | u(1) |
|   if( ChromaArrayType != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( pps_weighted_bipred_flag && wp_info_in_ph_flag ) | |
|     num_l1_weights | ue(v) |
|   for( i = 0; i < NumWeightsL1; i++ ) | |
|     luma_weight_l1_flag[ i ] | u(1) |
|   if( ChromaArrayType != 0 ) | |
|     for( i = 0; i < NumWeightsL1; i++ ) | |
|       chroma_weight_l1_flag[ i ] | u(1) |
|   for( i = 0; i < NumWeightsL1; i++ ) { | |
|     if( luma_weight_l1_flag[ i ] ) { | |
|       delta_luma_weight_l1[ i ] | se(v) |
|       luma_offset_l1[ i ] | se(v) |
|     } | |
|     if( chroma_weight_l1_flag[ i ] ) | |
|       for( j = 0; j < 2; j++ ) { | |
|         delta_chroma_weight_l1[ i ][ j ] | se(v) |
|         delta_chroma_offset_l1[ i ][ j ] | se(v) |
|       } | |
|   } | |
| } | |

Delta QP

When the picture is Intra the ph_cu_qp_delta_subdiv_intra_slice and the ph_cu_chroma_qp_offset_subdiv_intra_slice are decoded if needed. And if Inter slice is allowed the ph_cu_qp_delta_subdiv_inter_slice and the ph_cu_chroma_qp_offset_subdiv_inter_slice are decoded if needed. Finally, the picture header extension syntax elements are decoded if needed.

All parameters alf_info_in_ph_flag, rpl_info_in_ph_flag, qp_delta_info_in_ph_flag sao_info_in_ph_flag, dbf_info_in_ph_flag, wp_info_in_ph_flag are signalled in the PPS.

TABLE 9

| Picture header structure | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |

TABLE 9-continued

| Picture header structure | |
|---|---|
| | Descriptor |
| ph_pic_order_cnt_lsb | u(v) |
| if( gdr_or_irap_pic_flag ) | |
|   no_output_of_prior_pics_flag | u(1) |
| if( gdr_pic_flag ) | |
|   recovery_poc_cnt | ue(v) |
| for( i = 0; i < NumExtraPhBits; i++ ) | |
|   ph_extra_bit[ i ] | u(1) |
| if( sps_poc_msb_flag ) { | |
|   ph_poc_msb_present_flag | u(1) |
|   if( ph_poc_msb_present_flag ) | |
|     poc_msb_val | u(v) |
| } | |
| if( sps_alf_enabled_flag && alf_info_in_ph_flag ) { | |
|   ph_alf_enabled_flag | u(1) |
|   if( ph_alf_enabled_flag ) { | |
|     ph_num_alf_aps_ids_luma | u(3) |
|     for( i = 0; i < ph_num_alf_aps_ids_luma; i++ ) | |
|       ph_alf_aps_id_luma[ i ] | u(3) |
|     if( ChromaArrayType != 0 ) | |
|       ph_alf_chroma_idc | u(2) |
|     if( ph_alf_chroma_idc > 0 ) | |
|       ph_alf_aps_id_chroma | u(3) |
|     if( sps_ccalf_enabled_flag ) { | |
|       ph_cc_alf_cb_enabled_flag | u(1) |
|       if( ph_cc_alf_cb_enabled_flag ) | |
|         ph_cc_alf_cb_aps_id | u(3) |
|       ph_cc_alf_cr_enabled_flag | u(1) |
|       if( ph_cc_alf_cr_enabled_flag ) | |
|         ph_cc_alf_cr_aps_id | u(3) |
|     } | |
|   } | |
| } | |
| if( sps_lmcs_enabled_flag ) { | |
|   ph_lmcs_enabled_flag | u(1) |
|   if( ph_lmcs_enabled_flag ) { | |
|     ph_lmcs_aps_id | u(2) |
|     if( ChromaArrayType != 0 ) | |
|       ph_chroma_residual_scale_flag | u(1) |
|   } | |
| } | |
| if( sps_scaling_list_enabled_flag ) { | |
|   ph_scaling_list_present_flag | u(1) |
|   if( ph_scaling_list_present_flag ) | |
|     ph_scaling_list_aps_id | u(3) |
| } | |
| if( sps_virtual_boundaries_enabled_flag && !sps_virtual_boundaries_present_flag ) { | |
|   ph_virtual_boundaries_present_flag | u(1) |
|   if( ph_virtual_boundaries_present_flag ) { | |
|     ph_num_ver_virtual_boundaries | u(2) |
|     for( i = 0; i < ph_num_ver_virtual_boundaries; i++ ) | |
|       ph_virtual_boundaries_pos_x[ i ] | u(13) |
|     ph_num_hor_virtual_boundaries | u(2) |
|     for( i = 0; i < ph_num_hor_virtual_boundaries; i++ ) | |
|       ph_virtual_boundaries_pos_y[ i ] | u(13) |
|   } | |
| } | |
| if( output_flag_present_flag ) | |
|   pic_output_flag | u(1) |
| if( rpl_info_in_ph_flag ) | |
|   ref_pic_lists( ) | |
| if( partition_constraints_override_enabled_flag ) | |
|   partition_constraints_override_flag | u(1) |
| if( ph_intra_slice_allowed_flag ) { | |
|   if( partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { | |
|       ph_log2_diff_max_bt_min_qt_intra_slice_luma | ue(v) |
|       ph_log2_diff_max_tt_min_qt_intra_slice_luma | ue(v) |
|     } | |
|     if( qtbtt_dual_tree_intra_flag ) { | |
|       ph_log2_diff_min_qt_min_cb_intra_slice_chroma | ue(v) |

TABLE 9-continued

Picture header structure

| | Descriptor |
|---|---|
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |
|         ph_log2_diff_max_tt_min_qt_intra_slice_chroma | ue(v) |
|       } | |
|     } | |
|   } | |
|   if( cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if( ( ph_collocated_from_l0_flag && | |
|         num_ref_entries[ 0 ][ RplsIdx[ 0 ] ] > 1 ) \|\| | |
|         ( !ph_collocated_from_l0_flag && | |
|         num_ref_entries[ 1 ][ RplsIdx[ 1 ] ] > 1 ) ) | |
|       ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |
|   if( sps_dmvr_pic_present_flag ) | |
|     ph_disable_dmvr_flag | u(1) |
|   if( sps_prof_pic_present_flag ) | |
|     ph_disable_prof_flag | u(1) |
|   if( ( pps_weighted_pred_flag \|\| pps_weighted_bipred_flag ) && wp_info_in_ph_flag ) | |
|     pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag ) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |

TABLE 9-continued

| Picture header structure | |
|---|---|
| | Descriptor |
|         ph_cr_beta_offset_div2 | se(v) |
|         ph_cr_tc_offset_div2 | se(v) |
|       } | |
|     } | |
|   } | |
| } | |
| if( picture_header_extension_present_flag ) { | |
|   ph_extension_length | ue(v) |
|   for( i = 0; i < ph_extension_length; i++) | |
|     ph_extension_data_byte[ i ] | u(8) |
|   } | |
| } | |

Slice Header

The Slice header is transmitted at the beginning of each slice. The slice header contains about 65 syntax elements. This is very large compared to the previous slice header in earlier video coding standards. A complete description of all the slice header parameters can be found in JVET-Q2001-vD. Table 10 shows these parameters in a current slice header decoding syntax.

TABLE 10

| Partial Slice header | |
|---|---|
| | Descriptor |
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) \|\| | |
|     ( !rect_slice_flag && NumTilesInPic > 1 ) ) | |
|     slice_address | u(v) |
|   for( i = 0; i < NumExtraShBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
|   if( separate_colour_plane_flag = = 1 ) | |
|     colour_plane_id | u(2) |
|   if( !rpl_info_in_ph_flag && ( ( nal_unit_type != IDR_W_RADL && nal_unit_type != | |
|     IDR_N_LP ) \|\| sps_idr_rpl_present_flag ) ) | |
|     ref_pic_lists( ) | |
|   if( ( rpl_info_in_ph_flag \|\| ( ( nal_unit_type != IDR_W_RADL && nal_unit_type != | |
|     IDR_N_LP ) \|\| sps_idr_rpl_present_flag ) ) && | |
|     ( ( slice_type != I && num_ref_entries[ 0 ][ RplsIdx[ 0 ] ] > 1 ) \|\| | |
|     ( slice_type = = B && num_ref_entries[ 1 ][ RplsIdx[ 1 ] ] > 1 ) ) ) { | |
|     num_ref_idx_active_override_flag | u(1) |
|     if( num_ref_idx_active_override_flag ) | |
|       for( i = 0; i < ( slice_type = = B ? 2: 1 ); i++) | |
|         if( num_ref_entries[ i ][ RplsIdx[ i ] ] > 1 ) | |

TABLE 10-continued

Partial Slice header

|  | Descriptor |
|---|---|
| num_ref_idx_active_minus1[ i ] | ue(v) |
| } |  |
| if( slice_type != I ) { |  |
|   if( cabac_init_present_flag ) |  |
|     cabac_init_flag | u(1) |
|   if( ph_temporal_mvp_enabled_flag && !rpl_info_in_ph_flag ) { |  |
|     if( slice_type = = B ) |  |
|       slice_collocated_from_l0_flag | u(1) |
|     if( ( slice_collocated_from_l0_flag && NumRefIdxActive[ 0 ] > 1 ) \|\| |  |
|       ( ! slice_collocated_from_l0_flag && NumRefIdxActive[ 1 ] > 1 ) ) |  |
|       slice_collocated_ref_idx | ue(v) |
|   } |  |
|   if( !wp_info_in_ph_flag && ( ( pps_weighted_pred_flag && slice_type = = P ) \|\| |  |
|     ( pps_weighted_bipred_flag && slice_type = = B ) ) ) |  |
|     pred_weight_table( ) |  |
| } |  |
| if( !qp_delta_info_in_ph_flag ) |  |
|   slice_qp_delta | se(v) |
| if( pps_slice_chroma_qp_offsets_present_flag ) { |  |
|   slice_cb_qp_offset | se(v) |
|   slice_cr_qp_offset | se(v) |
|   if( sps_joint_cbcr_enabled_flag ) |  |
|     slice_joint_cbcr_qp_offset | se(v) |
| } |  |
| if( pps_cu_chroma_qp_offset_list_enabled_flag ) |  |
|   cu_chroma_qp_offset_enabled_flag | u(1) |
| if( sps_sao_enabled_flag && !sao_info_in_ph_flag ) { |  |
|   slice_sao_luma_flag | u(1) |
|   if( ChromaArrayType != 0 ) |  |
|     slice_sao_chroma_flag | u(1) |
| } |  |
| if( deblocking_filter_override_enabled_flag && !dbf_info_in_ph_flag ) |  |
|   slice_deblocking_filter_override_flag | u(1) |
| if( slice_deblocking_filter_override_flag ) { |  |
|   slice_deblocking_filter_disabled_flag | u(1) |
|   if( !slice_deblocking_filter_disabled_flag ) { |  |
|     slice_beta_offset_div2 | se(v) |
|     slice_tc_offset_div2 | se(v) |
|     slice_cb_beta_offset_div2 | se(v) |
|     slice_cb_tc_offset_div2 | se(v) |
|     slice_cr_beta_offset_div2 | se(v) |
|     slice_cr_tc_offset_div2 | se(v) |
|   } |  |
| } |  |
| slice_ts_residual_coding_disabled_flag | u(1) |
| if( ph_lmcs_enabled_flag ) |  |
|   slice_lmcs_enabled_flag | u(1) |
| if( ph_scaling_list_present_flag ) |  |
|   slice_scaling_list_present_flag | u(1) |
| if( NumEntryPoints > 0 ) { |  |
|   offset_len_minus1 | ue(v) |
|   for( i = 0; i < NumEntryPoints; i++ ) |  |
|     entry_point_offset_minus1[ i ] | u(v) |
| } |  |
| if( slice_header_extension_present_flag ) { |  |
|   slice_header_extension_length | ue(v) |
|   for( i = 0; i < slice_header_extension_length; i++ ) |  |
|     slice_header_extension_data_byte[ i ] | u(8) |
| } |  |
| byte_alignment( ) |  |
| } |  |

First the picture_header_in_slice_header_flag is decoded to know if the picture_header_structure( ) is present in the slice header.

The slice_subpic_id if needed, is then decoded to determine the sub picture id of the current slice. Then the slice_address is decoded to determine the address of the current slice. The num_tiles_in_slice_minus1 is then decoded if the number of tiles in the current picture is greater than one.

Then the slice_type is decoded.

If ALF is enabled at SPS level (sps_alf_enabled_flag) and if ALF is signalled in the slice header (alf_info_in_ph_flag equal to 0), then ALF information is decoded. This includes a flag indicating that ALF is enabled for the current slice (slice_alf_enabled_flag). If it is enabled, the number of APS ALF ID for luma (slice_num_alf_aps_ids_luma) is decoded, then the APS ID are decoded (slice_alf_aps_id_luma[i]). Then the slice_alf_chroma_idc is decoded to know if ALF is enabled for the Chroma components and which chroma component it is enabled. Then the APS ID for Chroma is decoded slice_alf_aps_id_chroma if needed. In the same way, the slice_cc_alf_cb_enabled_flag is decoded, if needed, to know if the CC ALF method is enabled. IF CC ALF is enabled, the related APS ID for CR and/or CB are decoded if CC ALF is enabled for CR and/or CB.

If the colour planes are transmitted independently (separate_colour_plane_flag equals to 1) the colour_plane_id is decoded.

When the reference picture lists are not transmitted in the picture header (rpl_info_in_ph_flag equal to 0) and when the Nal unit is not an IDR or if the reference pictures lists are transmitted for IDR pictures (sps_idr_rpl_present_flag equals to 1) then the Reference picture lists parameters are decoded; these are similar to those in the picture header.

If the reference picture lists are transmitted in the picture header (rpl_info_in_ph_flag equal to 1) or the Nal unit is not an IDR or if the reference picture lists are transmitted for IDR pictures (sps_idr_rpl_present_flag equals to 1) and if the number of reference for at least one list is superior to 1, the override flag num_ref_idx_active_override_flag is decoded.

If this flag is enabled the reference index for each list are decoded.

When the slice type is not intra and if needed the cabac_init_flag is decoded. If the reference picture lists are transmitted in the slice header and come other conditions, the slice_collocated_from_l0_flag and the slice_collocated_ref_idx are decoded. These data are related to the CABAC coding and the motion vector collocated.

In the same way, when the slice type is not Intra, the parameters of the weighted prediction pred_weight_table( ) are decoded.

The slice_qp_delta is decoded bif the delta QP information is transmitted in the slice header (qp_delta_info_in_ph_flag equal to 0). If needed the syntax elements, slice_cb_qp_offset, slice_cr_qp_offset, slice_joint_cbcr_qp_offset, cu_chroma_qp_offset_enabled_flag are decoded.

If the SAO information are transmitted in the slice header (sao_info_in_ph_flag equal to 0) and if it is enabled at SPS level (sps_sao_enabled_flag), the enabled flags for SAO are decoded for both luma and chroma: slice_sao_luma_flag, slice_sao_chroma_flag.

Then the deblocking filter parameters are decoded if they are signalled in the slice header (dbf_info_in_ph_flag equal to 0).

The flag slice_ts_residual_coding_disabled_flag is systematically decoded to know if the Transform Skip residual coding method is enabled for the current slice.

If LMCS was enabled in the picture header (ph_lmcs_enabled_flag equal 1), the flag slice_lmcs_enabled_flag is decoded.

In the same way, if the scaling list was enabled in the picture header (phpic_scaling_list_presentenabled_flag equal 1), the flag slice_scaling_list_present_flag is decoded.

Then other parameters are decoded if needed.

Picture Header in the Slice Header

Figure 7:
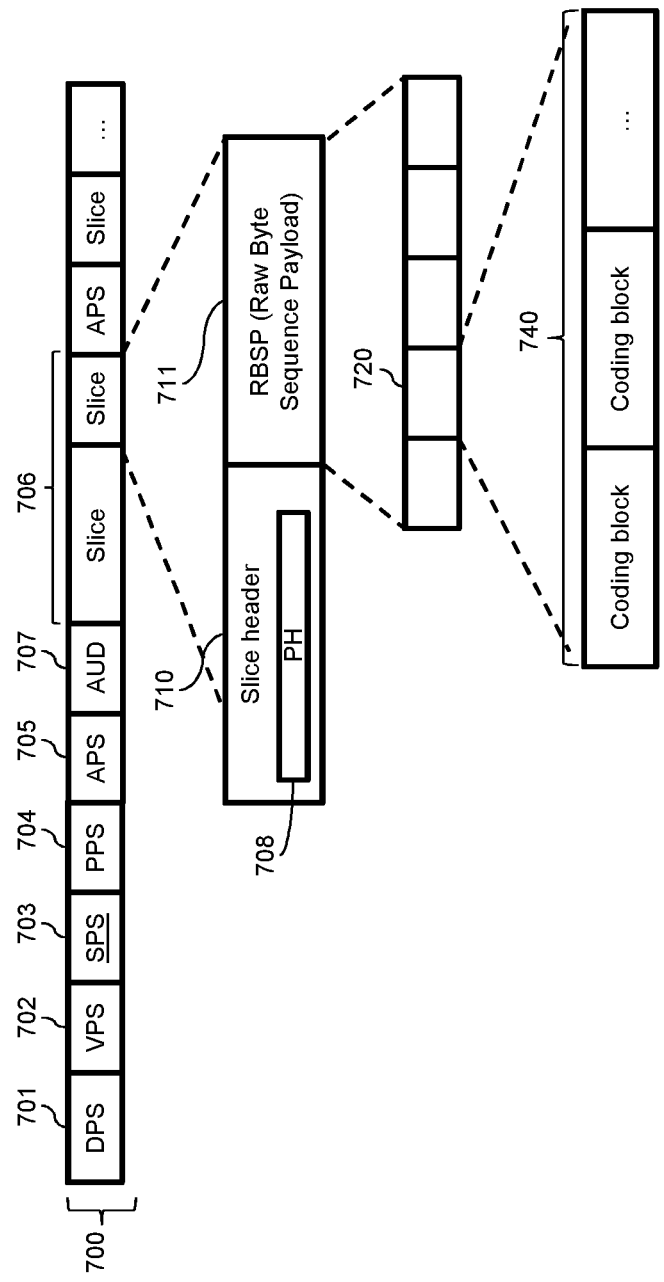
FIG. 7 illustrates another structure of the bitstream in the exemplary coding system VVC

In a particular signalling way, the picture header 708 can be signalled inside the slice header 710 as depicted in the FIG. 7. In that case there is no Nal unit containing only the picture header 608. The units 701, 702, 703, 704, 705, 706, 707, 720, and 740 correspond to 601, 602, 603, 604, 605, 606, 606, 620, and 640 of FIG. 6 and, thus can be understood from the preceding description. This can be enabled in the slice header thanks to the flag picture_header_in_slice_header_flag. Moreover, when the picture header is signalled inside the slice header, the picture shall contain only one slice. So, there is always only one picture header per picture. Moreover, the flag picture_header_in_slice_header_flag shall have the same value for all pictures of a CLVS (Coded Layer Video Sequence). It means that all pictures between two IRAP including the first IRAP has only one slice per picture.

The flag picture_header_in_slice_header_flag is defined as the following: "picture_header_in_slice_header_flag equal to 1 specifies that the PH syntax structure is present in the slice header. picture_header_in_slice_header_flag equal to 0 specifies that the PH syntax structure is not present in the slice header.

It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no VCL NAL unit with nal_unit_type equal to PH_NUT shall be present in the CLVS.

When picture_header_in_slice_header_flag is equal to 0, all coded slices in the current picture shall have picture_header_in_slice_header_flag is equal to 0, and the current PU shall have a PH NAL unit.

The picture_header_structure( ) contains syntax elements of the picture_rbsp( ) except the stuffing bits rbsp_trailing_bits( )."

Interaction Between Picture Header in Slice Header and Tools Signalling in Picture Header and Slice Header The QP Delta information, the reference picture lists parameters, the deblocking filter parameters, the sample adaptive offsets parameters, the weighted prediction parameters and the ALF parameters can be transmitted in the picture header or in the slice header thanks to the respective flags:

qp_delta_info_in_ph_flag rpl_info_in_ph_flag dbf_info_in_ph_flag sao_info_in_ph_flag wp_info_in_ph_flag alf_info_in_ph_flag These flags are transmitted in the PPS.

As shown in Table 11 Summary of XXX signalling according to the flags *picture_header_in_slice_header_flag* and *xxx_info_in_ph_flag*, by considering "xxx" for one of the mentioned tools, xxx can be signalled in the slice header when xxx_info_in_ph_flag is set equal to 0 with the current syntax. In other words, we use the shorthand XXX or xxx in the subsequent description to refer to the information types (examples of which are given above) that may be signalled in both the picture header and the slice header.

TABLE 11

Summary of XXX signalling according to the flags
picture_header_in_slice_header_flag and xxx_info_in_ph_flag

|  | xxx_info_in_ph_flag = 1 | xxx_info_in_ph_flag = 0 |
|---|---|---|
| picture_header_in_slice_header_flag = 1 | XXX in Picture Header | XXX in Slice Header or not present |
| picture_header_in_slice_header_flag = 0 | XXX in Picture Header | XXX in Slice Header or not present |

When the picture header is in the slice header this implies only one slice is present for the current picture. Thus, having the information transmitted or transmittable for both slice and picture doesn't increase the flexibility for encoder or decoder as the parameters will be the same. In other words, if the information is in the picture header, corresponding information in the slice header will be redundant. Similarly, if the information is in the slice header, corresponding information in the picture header will be redundant. Embodiments described herein simplify the decoder implementation by limiting the redundancies in the signaling of the same coding. In particular, in embodiments, the information is permitted to be in the picture header but not the slice header when the picture header is signalled in the slice header.

Streaming Applications

Some streaming applications only extract certain parts of the bitstream. These extractions can be spatial (as the sub-picture) or temporal (a subpart of the video sequence). Then these extracted parts can be merged with other bitstreams. Some other reduce the frame rate by extracting only some frames. Generally, the main aim of these streaming applications is to use the maximum of the allowed bandwidth to produce the maximum quality to the end user.

In VVC, the APS ID numbering has been limited for frame rate reduction, in order that a new APS id number for a frame can't be used for a frame at an upper level in the temporal hierarchy. However, for streaming applications which extract parts of the bitstream the APS ID needs to be tracked to determine which APS should be keep for a sub part of the bitstream as the frame (as IRAP) don't reset the numbering of the APS ID.

LMCS (Luma Mapping with Chroma Scaling)

The Luma Mapping with Chroma scaling (LMCS) technique is a sample value conversion method applied on a block before applying the loop filters in a video decoder like VVC.

The LMCS can be divided into two sub-tools. The first one is applied on Luma block while the second sub-tool is applied on Chroma blocks as described below:

1) The first sub-tool is an in-loop mapping of the Luma component based on adaptive piecewise linear models. The in-loop mapping of the Luma component adjusts the dynamic range of the input signal by redistributing the codewords across the dynamic range to improve compression efficiency. Luma mapping makes use of a forward mapping function into the "mapped domain" and a corresponding inverse mapping function to come back in the "input domain".
2) The second sub-tool is related to the chroma components where a luma-dependent chroma residual scaling is applied. Chroma residual scaling is designed to compensate for the interaction between the luma signal and its corresponding chroma signals. Chroma residual scaling depends on the average value of top and/or left reconstructed neighbouring luma samples of the current block.

Like most other tools in video coder like VVC, LMCS can be enabled/disabled at the sequence level using an SPS flag. Whether chroma residual scaling is enabled or not is also signalled at the slice level. If luma mapping is enabled, an additional flag is signalled to indicate if luma-dependent chroma residual scaling is enabled or not. When luma mapping is not used, luma-dependent chroma residual scaling is fully disabled. In addition, luma-dependent chroma residual scaling is always disabled for the chroma blocks whose size is less than or equal to 4.

Figure 8:
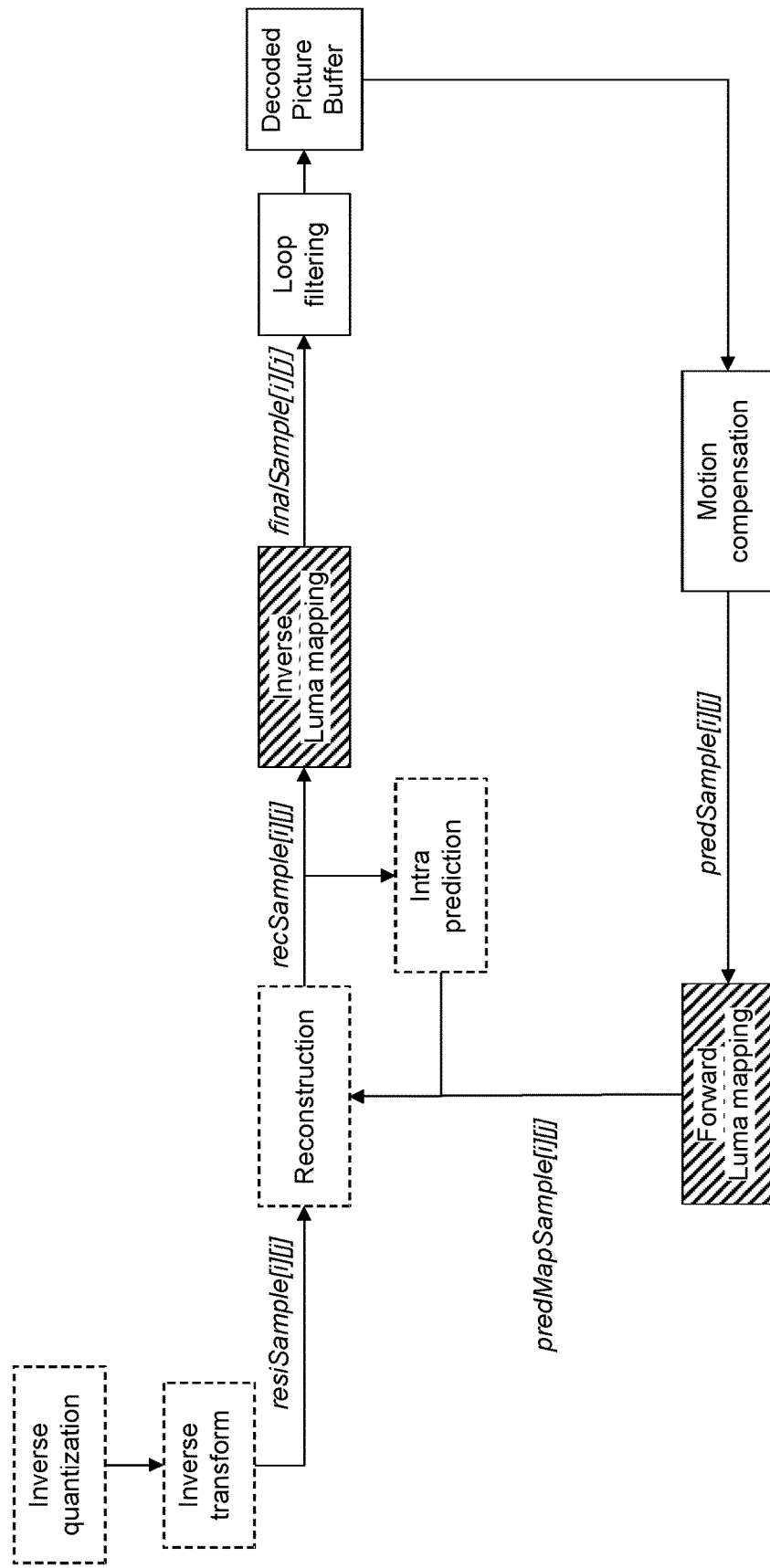
FIG. 8 illustrates Luma Modelling Chroma Scaling (LMCS)

FIG. 8 shows the principle of the LMCS as explained above for the Luma mapping sub-tool. The hatched blocks in FIG. 8 are the new LMCS functional blocks, including forward and inverse mapping of the luma signal. It is important to note that, when using LMCS, some decoding operations are applied in the "mapped domain". These operations are represented by blocks in dashed lines in this FIG. 8. They typically correspond to the inverse quantization, the inverse transform, the luma intra prediction and the reconstruction step which consists in adding the luma prediction with the luma residual. Conversely, the solid line blocks in FIG. 8 indicate where the decoding process is applied in the original (i.e., non-mapped) domain and this includes the loop filtering such as deblocking, ALF, and SAO, the motion compensated prediction, and the storage of decoded pictures as reference pictures (DPB).

Figure 9:
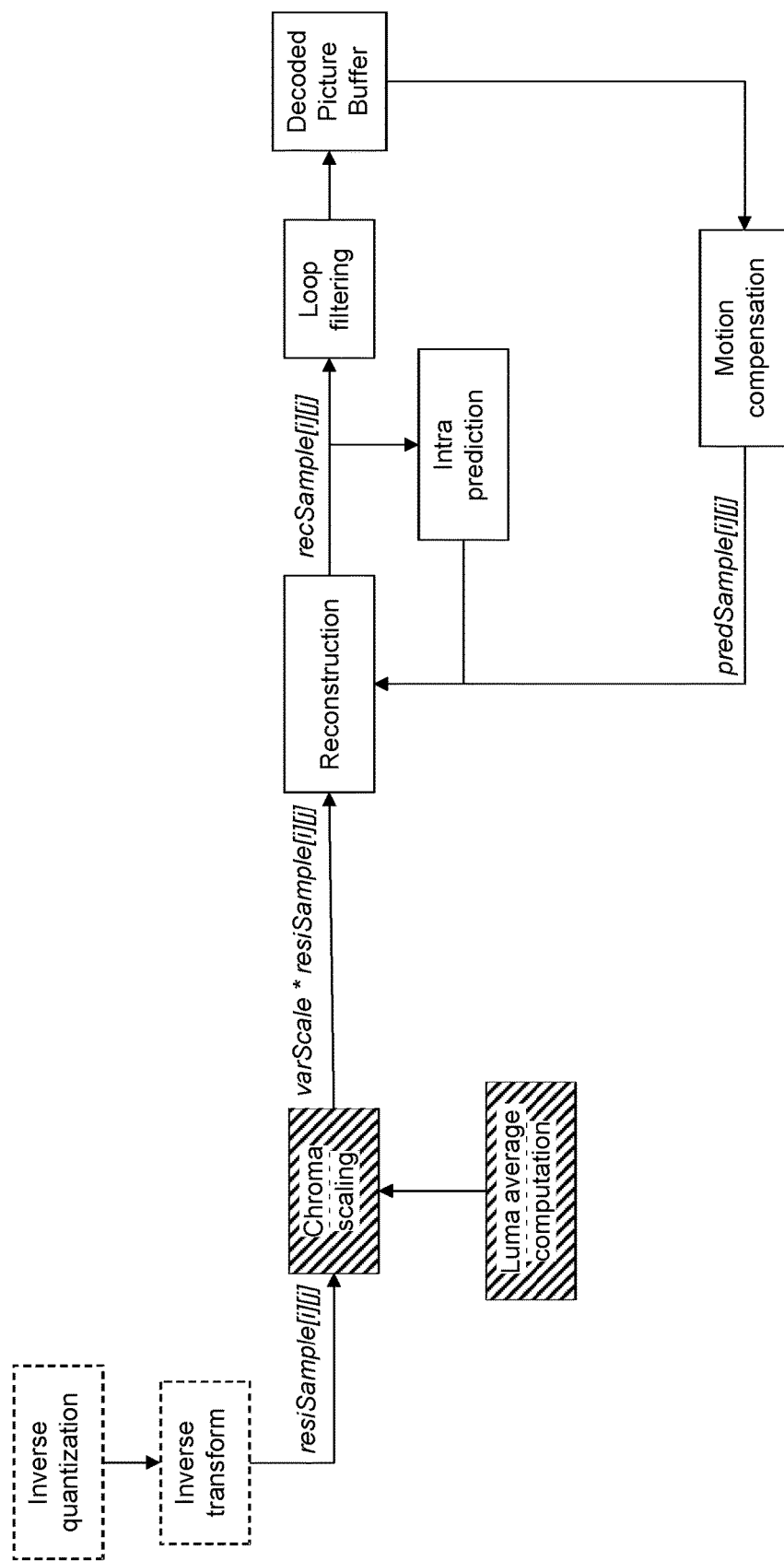
FIG. 9 shows a sub tool of LMCS.

FIG. 9 shows a similar diagram as FIG. 8 but this time this is for the Chroma scaling sub-tool of the LMCS tool. The hatched block in FIG. 9 is the new LMCS functional block which includes the luma-dependent chroma scaling process. However, in Chroma, there are some important differences compared to the Luma case. Here only the inverse quantization and the inverse transform represented by block in dash lines are performed in the "mapped domain" for the Chroma samples. All the other steps of Intra Chroma prediction, motion compensation, loop filtering are performed in the original domain. As depicted in FIG. 9, there is only a scaling process and there is no forward and inverse processing as for the Luma mapping.

Luma Mapping by Using Piece Wise Linear Model.

The luma mapping sub-tool is using a piecewise linear model. It means that the piecewise linear model separates the input signal dynamic range into 16 equal sub-ranges, and for each sub-range, its linear mapping parameters are expressed using the number of codewords assigned to that range.

Semantics for Luma Mapping

The syntax element lmcs_min_bin_idx specifies the minimum bin index used in the luma mapping with chroma scaling (LMCS) construction process. The value of lmcs_min_bin_idx shall be in the range of 0 to 15, inclusive.

The syntax element lmcs_delta_max_bin_idx specifies the delta value between 15 and the maximum bin index LmcsMaxBinIdx used in the luma mapping with chroma scaling construction process. The value of lmcs_delta_max_bin_idx shall be in the range of 0 to 15, inclusive. The value of LmcsMaxBinIdx is set equal to 15−lmcs_delta_max_bin_idx. The value of LmcsMaxBinIdx shall be greater than or equal to lmcs_min_bin_idx.

The syntax element lmcs_delta_cw_prec_minus1 plus 1 specifies the number of bits used for the representation of the syntax lmcs_delta_abs_cw[i].

The syntax element lmcs_delta_abs_cw[i] specifies the absolute delta codeword value for the $i_{th}$ bin.

The syntax element lmcs_delta_sign_cw_flag[i] specifies the sign of the variable lmcsDeltaCW[i]. When lmcs_delta_sign_cw_flag[i] is not present, it is inferred to be equal to 0.

LMCS Intermediate Variables Computation for Luma Mapping

In order to apply the forward and inverse Luma mapping processes, some intermediate variables and data arrays are needed.

First of all, the variable OrgCW is derived as follows:

$$OrgCW=(1<<BitDepth)/16$$

Then, the variable lmcsDeltaCW[i], with i=lmcs_min_bin_idx . . . LmcsMaxBinIdx, is computed as follows:

$$lmcsDeltaCW[i]=(1−2*lmcs\_delta\_sign\_cw\_flag[i])*lmcs\_delta\_abs\_cw[i]$$

The new variable lmcsCW[i] is derived as follows:
For i=0 . . . lmcs_min_bin_idx−1, lmcsCW[i] is set equal 0.
For i=lmcs_min_bin_idx . . . LmcsMaxBinIdx, the following applies:

$$lmcsCW[i]=OrgCW+lmcsDeltaCW[i]$$

The value of lmcsCW[i] shall be in the range of (OrgCW>>3) to (OrgCW<<3−1), inclusive.
For i=LmcsMaxBinIdx+1 . . . 15, lmcsCW[i] is set equal 0.

The variable InputPivot[i], with i=0 . . . 16, is derived as follows:

$$InputPivot[i]=i*OrgCW$$

The variable LmcsPivot[i] with i=0 . . . 16, the variables ScaleCoeff[i] and InvScaleCoeff[i] with i=0 . . . 15, are computed as follows:

$$LmcsPivot[0]=0;$$

$$for(i=0; i<=15; i++) \{LmcsPivot[i+1]=LmcsPivot[i]+lmcsCW[i]$$

$$ScaleCoeff[i]=(lmcsCW[i]*(1<<11)+(1<<(Log 2(OrgCW)−1)))>>(Log 2(OrgCW))$$

if(lmcsCW[i]=0)

InvScaleCoeff[i]=0 else $$InvScaleCoeff[i]=OrgCW*(1<<11)/lmcsCW[i]$$

Forward Luma Mapping

As illustrated by FIG. 8 when the LMCS is applied for Luma, the Luma remapped sample called predMapSamples[i][j] is obtained from the prediction sample predSamples[i][j].

The predMapSamples[i][j] is computed as follows:
First of all, an index idxY is computed from the prediction sample predSamples[i][j], at location (i, j)

$$idxY=predSamples[i][j]>>Log\ 2(OrgCW)$$

Then predMapSamples[i][j] is derived as follows by using the intermediate variables idxY, LmcsPivot[idxY] and InputPivot[idxY] of section 0:

$$predMapSamples[i][j]=LmcsPivot[idxY]+(ScaleCoeff[idxY]*(predSamples[i][j]−InputPivot[idxY])+(1<<10))>>11$$

Luma Reconstruction Samples

The reconstruction process is obtained from the predicted luma sample predMapSample[i][j] and the residual luma samples resiSamples[i][j].

The reconstructed luma picture sample recSamples [i][j] is simply obtained by adding predMapSample[i][j] to resiSamples[i][j] as follows:

$$recSamples[i][j]=Clip1(predMapSamples[i][j]+resiSamples[i][j])$$

In this above relation, the Clip 1 function is a clipping function to make sure that the reconstructed sample is between 0 and 1<<BitDepth−1.

Inverse Luma Mapping

When applying the inverse luma mapping according to FIG. 8, the following operations are applied on each sample recSample[i][j] of the current block being processed:
First, an index idxY is computed from the reconstruction sample recSamples[i][j], at location (i,j)

$$idxY=recSamples[i][j]>>Log\ 2(OrgCW)$$

The inverse mapped luma sample invLumaSample[i][j] is derived as follows based on the:

$$invLumaSample[i][j]=InputPivot[idxYInv]+(InvScaleCoeff[idxYInv]*(recSample[i][j]−LmcsPivot[idxYInv])+(1<<10))>>11$$

A clipping operation is then done to get the final sample:

$$finalSample[i][j]=Clip1(invLumaSample[i][j])$$

Chroma Scaling

LMCS Semantics for Chroma Scaling

The syntax element lmcs_delta_abs_crs in Table 6 specifies the absolute codeword value of the variable lmcsDeltaCrs. The value of lmcs_delta_abs_crs shall be in the range of 0 and 7, inclusive. When not present, lmcs_delta_abs_crs is inferred to be equal to 0.

The syntax element lmcs_delta_sign_crs_flag specifies the sign of the variable lmcsDeltaCrs. When not present, lmcs_delta_sign_crs_flag is inferred to be equal to 0.

LMCS Intermediate Variable Computation for Chroma Scaling

To apply the Chroma scaling process, some intermediate variables are needed.

The variable lmcsDeltaCrs is derived as follows:

$$lmcsDeltaCrs=(1−2*lmcs\_delta\_sign\_crs\_flag)*lmcs\_delta\_abs\_crs$$

The variable ChromaScaleCoeff[i], with i=0 . . . 15, is derived as follows:

if(lmcsCW[i]==0)

$$ChromaScaleCoeff[i]=(1<11)$$

else

ChromaScaleCoeff[$i$]=OrgCW*(1<<11)/(lmcsCW[$i$]+lmcsDeltaCrs)

Chroma Scaling Process

In a first step, the variable invAvgLuma is derived in order to compute the average luma value of reconstructed Luma samples around the current corresponding Chroma block. The average Luma is computed from left and top luma block surrounding the corresponding Chroma block If no sample is available the variable invAvgLuma is set as follows:

invAvgLuma=1<<(BitDepth−1)

Based on the intermediate arrays LmcsPivot[ ] of section 0, the variable idxYInv is then derived as follows:

For (idxYInv=lmcs_min_bin_idx; idxYInv<=LmcsMaxBinIdx; idxYInv++) {if (invAvgLuma<LmcsPivot [idxYInv+1]) break}

IdxYInv=Min(idxYInv, 15)

The variable varScale is derived as follows:

varScale=ChromaScaleCoeff[idxYInv]

When a transform is applied on the current Chroma block, the reconstructed Chroma picture sample array recSamples is derived as follows recSamples[$i$][$j$]=Clip1(predSamples[$i$][$j$]+Sign(resiSamples[$i$][$j$])*((Abs(resiSamples[$i$][$j$])*varScale+(1<<10))>>11))

If no transform has been applied for the current block, the following applies:

recSamples[$i$][$j$]=Clip1(predSamples[$i$][$j$])

Encoder Consideration

The basic principle of an LMCS encoder is to first assign more codewords to ranges where those dynamic range segments have lower codewords than the average variance. In an alternative formulation of this, the main target of LMCS is to assign fewer codewords to those dynamic range segments that have higher codewords than the average variance. In this way, smooth areas of the picture will be coded with more codewords than average, and vice versa.

All the parameters (see Table 6) of the LMCS tools which are stored in the APS are determined at the encoder side. The LMCS encoder algorithm is based on the evaluation of local luma variance and is optimizing the determination of the LMCS parameters according to the basic principle described above. The optimization is then conducted to get the best PSNR metrics for the final reconstructed samples of a given block.

Embodiments where Information is Signalled in the Picture Header and not in the Slice Header In embodiments, the signalling of an information which can be signalled into the picture header or in the slice header is signalled in the picture header and not in the slice header when the picture header is signalled in the slice header. In an equivalent way, the picture header is not signalled in the slice header when the signalling of an information, which can be signalled into the picture header or in the slice header, is signalled in the slice header. In another equivalent way, the picture header is signalled in the slice header when the signalling of an information, which can be signalled into the picture header or in the slice, is signalled in the picture header. Table 12 illustrates an implementation of embodiments where a tool name is replaced by XXX. In this table, the signalling of parameters is not authorized in the slice header when the picture header is signalled in the slice header.

TABLE 12

Summary of signalling

| | xxx_info_in_ph_flag = 1 | xxx_info_in_ph_flag = 0 |
|---|---|---|
| picture_header_in_slice_header_flag = 1 | XXX in Picture Header | Not Applicable |
| picture_header_in_slice_header_flag = 0 | XXX in Picture Header | XXX in Slice Header or not present |

In one embodiment, the following condition is added in the semantics of xxx_info_in_ph_flag:

"When slice headers referring to the PPS contains the PH syntax structure, it is a requirement of bitstream conformance that XXX_info_in_ph_flag shall be equal to 1."

And/or

"When XXX_info_in_ph_flag is equal to 0, the picture_header_in_slice_header_flag shall be equal to 0"

When the picture header is in the slice header this implies only one slice is present for the current picture. Thus, having the information transmitted or transmittable for both slice and picture doesn't increase the flexibility for encoder or decoder as the parameters will be the same. In other words, if the information is in the picture header, corresponding information in the slice header will be redundant. Similarly, if the information is in the slice header, corresponding information in the picture header will be redundant. By enforcing a condition so that such information may be in the picture header and not in the slice header in a case where the picture header is in the slice header, the decoder implementation may be simplified by limiting the redundancies in the signaling.

QP (Quantization Parameter) Delta

In an embodiment, the QP delta signalling is avoided in the slice header when the picture header is signalled in the slice header. In an equivalent way, the picture header is not signalled in the slice header when the QP delta signalling, is signalled in the slice header. In another equivalent way, the picture header is signalled in the slice header when the QP delta is signalled in the picture header. In other words, the tool XXX mentioned above is QP Delta.

Table 13 illustrates a way that this may be implemented so that signalling of QP delta information is not authorized (i.e. not permitted) when the picture header is signalled in the slice header.

TABLE 13

| | QP delta signalling | |
|---|---|---|
| | qp_delta_info_in_ph_flag = 1 | qp_delta_info_in_ph_flag = 0 |
| picture_header_in_slice_header_flag = 1 | QP delta in Picture Header | Not Applicable |
| picture_header_in_slice_header_flag = 0 | QP delta in Picture Header | QP delta in Slice Header or not present |

When the picture header is in the slice header (implying only one slice is present for the current picture) the information being transmittable in slice and picture header doesn't increase the flexibility for encoder or decoder as the parameters will be the same. So to reduce the decoder implementation complexity it is better to have only one possible signaling QP delta information in one of the slice or picture header to code the same coding possibility, in this case the QP delta parameters (qp_delta_info).

In an implementation of the first embodiment following condition may be added in the semantics of qp_delta_info_in_ph_flag:

"When slice headers referring to the PPS contain the PH syntax structure, it is a requirement of bitstream conformance that qp_delta_info_in_ph_flag shall be equal to 1."

And/or

"When qp_delta_info_in_ph_flag is equal to 0, the picture_header_in_slice_header_flag shall be equal to 0"

In another embodiment, the decoding QP delta parameters in the slice header are authorized only when the value of the flag picture_header_in_slice_header_flag is set equal to 0 as depicted in Table 14. Modifications to the syntax are shown in underline. In this table, the slice_qp_delta information of the slice header can be decoded if QP delta information is signalled at slice level (qp_delta_info_in_ph_flag equal to 0) and if the picture header is not transmitted in the slice header (picture_header_in_slice_header_flag equal to 0).

TABLE 14

| Partial Slice header showing modification for QP delta | |
|---|---|
| | Descriptor |
| slice_header( ) { | |
|   picture_header_in_slice_header_flag | u(1) |
|   if( picture_header_in_slice_header_flag ) | |
|     picture_header_structure( ) | |
|   ... | |
|   if( !qp_delta_info_in_ph_flag && !picture_header_in_slice_header_flag) | |
|     slice_qp_delta | se(v) |
|   ... | |
| } | |

In an embodiment, the decoding QP delta parameters in the Picture header are systematically authorized when the value of the flag picture_header_in_slice_header_flag is set equal to 1 as depicted in Table 15. According to this table, the QP delta information of the slice header can be decoded only if QP delta information is signalled in the picture header (qp_delta_info_in_ph_flag equal to 1) or if the picture header is transmitted in the slice header (picture_header_in_slice_header_flag equal to 1).

TABLE 15

| Partial Picture header showing modification for QP Delta | |
|---|---|
| | Descriptor |
| picture_header_structure( ) { | |
|   ... | |
|   if( qp_delta_info_in_ph_flag || picture_header_in_slice_header_flag ) | |
|     ph_qp_delta | se(v) |
|   ... | |
| } | |

Reference Picture List (RPL)

In one embodiment, the signalling of reference picture lists is avoided in the slice header when the picture header is signalled in the slice header. In an equivalent way, the picture header is not signalled in the slice header when the signalling of reference picture lists, is signalled in the slice header. In another equivalent way, the picture header is signalled in the slice header when the signalling of reference picture lists is signalled in the picture header. In other words, the tool XXX mentioned above is RPL In other words, the tool XXX mentioned above is RPL.

Table 16 illustrates shows an implementation of this embodiment where RPL signalling is not authorized when the picture header is signalled in the slice header.

TABLE 16

Summary of RPL signalling.

|  | rpl_info_in_ph_flag = 1 | rpl_info_in_ph_flag = 0 |
| --- | --- | --- |
| picture_header_in_slice_header_flag = 1 | RPL in Picture Header | Not Applicable |
| picture_header_in_slice_header_flag = 0 | RPL in Picture Header | RPL in Slice Header or not present |

When the picture header is in the slice header (implying only one slice is present for the current picture) the information being transmittable in slice and picture header doesn't increase the flexibility for encoder or decoder as the parameters will be the same. According to this embodiment, the decoder implementation complexity is reduced because it is better to have only one possible signaling of information, in one of the slice or picture header to code the same coding possibility, in this case the reference picture list (RPL) information (rpl_info).

In an embodiment, the following condition is added in the semantics of rpl_info_in_ph_flag:

"When slice headers referring to the PPS contain the PH syntax structure, it is a requirement of bitstream conformance that rpl_info_in_ph_flag shall be equal to 1."

And/or

"When rpl_info_in_ph_flag is equal to 0, the picture_header_in_slice_header_flag shall be equal to 0"

In an embodiment, the decoding of reference picture lists parameters in the slice header is authorized only when the value of the flag picture_header_in_slice_header_flag is set equal to 0 as depicted in Table 17. In this table, the ref_pic_lists( ) information of the slice header can be decoded if the reference picture lists information is signalled at slice level (rpl_info_in_ph_flag equal to 0) and if the picture header is not transmitted in the slice header (picture_header_in_slice_header_flag equal to 0).

In an embodiment, the temporal parameters slice_collocated_from_l0_flag and slice_collocated_ref_idx can't be decoded when the picture header is in the slice header as depicted in Table 17.

TABLE 17

Partial Slice header showing modification for RPL

|  | Descriptor |
| --- | --- |
| slice_header( ) { | |
|   picture_header_in_slice_header_flag | u(1) |
|   if( picture_header_in_slice_header_flag ) | |
|     picture_header_structure( ) | |
|   ... | |
|   if( !rpl_info_in_ph_flag && !picture_header_in_slice_header_flag && ( ( nal_unit_type != IDR_W_RADL && nal_unit_type != | |
|     IDR_N_LP ) \| \| sps_idr_rpl_present_flag ) ) | |
|     ref_pic_lists( ) | |
|   if( ( rpl_info_in_ph_flag \| \| ( ( nal_unit_type != IDR_W_RADL && nal_unit_type != | |
|     IDR_N_LP ) \| \| sps_idr_rpl_present_flag ) ) && | |
|     ( slice_type != I && num_ref_entries[ 0 ][ RplsIdx[ 0 ] ] > 1 ) \| \| | |
|     ( slice_type = = B && num_ref_entries[ 1 ][ RplsIdx[ 1 ] ] > 1 ) ) { | |
|     num_ref_idx_active_override_flag | u(1) |
|     if( num_ref_idx_active_override_flag ) | |
|       for( i = 0; i < ( slice_type = = B ? 2: 1 ); i++ ) | |
|         if( num_ref_entries[ i ][ RplsIdx[ i ] ] > 1 ) | |
|           num_ref_idx_active_minus1[ i ] | ue(v) |
|   } | |
|   if( slice_type != I ) { | |
|     if( cabac_init_present_flag ) | |
|       cabac_init_flag | u(1) |
|     if( ph_temporal_mvp_enabled_flag && !rpl_info_in_ph_flag && | |
|   !picture_header_in_slice_header_flag) { | |
|       if( slice_type = = B ) | |
|         slice_collocated_from_l0_flag | u(1) |
|       if( ( slice_collocated_from_l0_flag && NumRefIdxActive[ 0 ] > 1 ) \| \| | |
|         ( ! slice_collocated_from_l0_flag && NumRefIdxActive[ 1 ] > 1 ) ) | |
|         slice_collocated_ref_idx | ue(v) |
|   } | |
|   ... | |

TABLE 17-continued

Partial Slice header showing modification for RPL

| | Descriptor |
|---|---|
| } | |
| ... | |
| } | |

In an embodiment, the decoding of RPL parameters in the Picture header is systematically authorized when the value of the flag picture_header_in_slice_header_flag is set equal to 1 as depicted in Table 18. In this table the RPL information of the picture header can be decoded only if RPL information is signalled at picture level (rpl_info_in_ph_flag equal to 1) or if the picture header is transmitted in the slice header (picture_header_in_slice_header_flag equal to 1).

In an embodiment, the temporal parameters ph_collocated_from_l0_flag and ph_collocated_ref_idx can be decoded when the picture header is in the slice header as depicted in Table 18.

TABLE 18

Partial Picture header showing modification for RPL

| | Descriptor |
|---|---|
| picture_header_structure( ) { | |
| ... | |
|   if( rpl_info_in_ph_flag \|\| picture_header_in_slice_header_flag ) | |
|     ref_pic_lists( ) | |
| ... | |
|     if( ph_temporal_mvp_enabled_flag && ( rpl_info_in_ph_flag \|\| picture_header_in_slice_header_flag ) { | |
|         ph_collocated_from_l0_flag | u(1) |
|         if( ( ph_collocated_from_l0_flag && | |
|           num_ref_entries[ 0 ][ RplsIdx[ 0 ] ] > 1 ) \|\| | |
|           ( !ph_collocated_from_l0_flag && | |
|           num_ref_entries[ 1 ][ RplsIdx[ 1 ] ] > 1 ) ) | |
|         ph_collocated_ref_idx | ue(v) |
|     } | |
| ... | |
| } | |

Deblocking Filter (DBF)

In an embodiment, the signalling of deblocking filter parameters is avoided in the slice header when the picture header is signalled in the slice header. In an equivalent way, the picture header is not signalled in the slice header when the signalling of deblocking filter parameters, is signalled in the slice header. In another equivalent way, the picture header is signalled in the slice header when the signalling of deblocking filter parameters is signalled in the picture header. In other words, the tool XXX mentioned above is DBF. In other words, the tool XXX mentioned above is DBF.

Table 19 illustrates an implementation according to this embodiment where DBF signalling is not authorized when the picture header is signalled in the slice header.

TABLE 19

Summary of DBF signalling

| | dbf_info_in_ph_flag = 1 | dbf_info_in_ph_flag = 0 |
|---|---|---|
| picture_header_in_slice_header_flag = 1 | DBF in Picture Header | Not Applicable |
| picture_header_in_slice_header_flag = 0 | DBF in Picture Header | DBF in Picture Header |

When the picture header is in the slice header, as only one slice is present for the current picture, the information transmitted in slice or picture doesn't increase the flexibility for encoder or decoder as the parameters are the same. So to reduce the decoder implementation complexity it is better to have only one possible signaling of DBF information to code the same coding possibility.

In an embodiment, the following condition is added in the semantics of dbf_info_in_ph_flag:
"When slice headers referring to the PPS contain the PH syntax structure, it is a requirement of bitstream conformance that dbf_info_in_ph_flag shall be equal to 1."

And/or
"When dbf_info_in_ph_flag is equal to 0, the picture_header_in_slice_header_flag shall be equal to 0"

In an embodiment, the DBF parameters in the slice header are authorized only when the value of the flag picture_header_in_slice_header_flag is set equal to 0 as depicted in Table 20. In this table, the slice_deblocking_filter_override_flag flag of the slice header can be decoded if DBF information is signalled at slice level (dbf_info_in_ph_flag equal to 0) and if the picture header is not transmitted in the slice header (picture_header_in_slice_header_flag equal to 0).

TABLE 20

Partial Slice header showing modification for DBF

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   ... | |
|   if( deblocking_filter_override_enabled_flag && !dbf_info_in_ph_flag && !picture_header_in_slice_header_flag) | |
|     slice_deblocking_filter_override_flag | u(1) |
|   if( slice_deblocking_filter_override_flag ) { | |
|     slice_deblocking_filter_disabled_flag | u(1) |
|     if( !slice_deblocking_filter_disabled_flag ) { | |
|     ... | |
|     } | |
|   } | |
|   ... | |
| } | |

In an embodiment, the DBF parameters in the picture header is systematically authorized when the value of the flag picture_header_in_slice_header_flag is set equal to 1 as depicted in Table 21. In this table the DBF information of the slice header can be decoded only if DBF information is signalled in the picture header (dbf_info_in_ph_flag equal to 1) or if the picture header is transmitted in the slice header (picture_header_in_slice_header_flag equal to 1).

TABLE 21

Partial Picture header showing modification for DBF

| | Descriptor |
|---|---|
| picture_header_structure( ) { | |
|   ... | |
|   if( deblocking_filter_override_enabled_flag && ( dbf_info_in_ph_flag \|\| picture_header_in_slice_header_flag ) ) { | |
|     ph_deblocking_filter_override_flag | u(1) |
|     if( ph_deblocking_filter_override_flag) { | |

TABLE 21-continued

Partial Picture header showing modification for DBF

| | Descriptor |
|---|---|
| ph_deblocking_filter_disabled_flag | u(1) |
| if( !ph_deblocking_filter_disabled flag) { | |
| ... | |
| } | |
| } | |
| } | |

SAO (Sample Adaptive Offset)

In one embodiment, the SAO signalling is avoided in the slice header when the picture header is signalled in the slice header. In an equivalent way, the picture header is not signalled in the slice header when the SAO signalling, is signalled in the slice header. In another equivalent way, the picture header is signalled in the slice header when the SAO signalling is signalled in the picture header. In other words, the tool XXX mentioned above is SAO.

Table 22 illustrates this embodiment where SAO signalling is not authorized when the picture header is signalled in the slice header.

TABLE 22

Summary of SAO signalling

| | sao_info_in_ph_flag = 1 | sao_info_in_ph_flag = 0 |
|---|---|---|
| picture_header_in_slice_header_flag = 1 | SAO in Picture Header | Not Applicable |
| picture_header_in_slice_header_flag = 0 | SAO in Picture Header | SAO in Slice Header or not present |

When the picture header is in the slice header, as only one slice is present for the current picture, the information transmitted in slice or picture doesn't increase the flexibility for encoder or decoder as the parameters are the same. So to reduce the decoder implementation complexity it is better to have only one possible signaling of SAO information to code the same coding possibility.

In an embodiment, the following condition is added in the semantics of sao_info_in_ph_flag:

"When slice headers referring to the PPS contain the PH syntax structure, it is a requirement of bitstream conformance that sao_info_in_ph_flag shall be equal to 1."

And/or

"When sao_info_in_ph_flag is equal to 0, the picture_header_in_slice_header_flag shall be equal to 0"

In an embodiment, the decoding SAO parameters in the slice header is authorized only when the value of the flag picture_header_in_slice_header_flag is set equal to 0 as depicted in Table 23. In this table the slice_sao_luma_flag flag of the slice header can be decoded if SAO information is signalled at slice level (sao_info_in_ph_flag equal to 0) and if the picture header is not transmitted in the slice header (picture_header_in_slice_header_flag equal to 0).

TABLE 23

Partial Slice header showing modification for SAO

| | Descriptor |
|---|---|
| slice_header( ) { | |
|   picture_header_in_slice_header_flag | u(1) |
|   if( picture_header_in_slice_header_flag ) | |
|     picture_header_structure( ) | |
| ... | |
|   if( sps_sao_enabled_flag && !sao_info_in_ph_flag && !picture_header_in_slice_header_flag ) { | |

TABLE 23-continued

Partial Slice header showing modification for SAO

| | Descriptor |
|---|---|
|     slice_sao_luma_flag | u(1) |
|     if( ChromaArrayType != 0 ) | |
|       slice_sao_chroma_flag | u(1) |
|   } | |
| ... | |
| } | |

In an embodiment, the decoding SAO parameters in the Picture header is systematically authorized when the value of the flag picture_header_in_slice_header_flag is set equal to 1 as depicted in Table 24. In this table the SAO information of the slice header can be decoded only if SAO information is signalled in the picture header (sao_info_in_ph_flag equal to 1) or if the picture header is transmitted in the slice header (picture_header_in_slice_header_flag equal to 1).

TABLE 24

Partial Picture header showing modification for SAO

| | Descriptor |
|---|---|
| picture_header_structure( ) {<br>...<br>  if( sps_sao_enabled_flag && ( sao_info_in_ph_flag \|\|<br>picture_header_in_slice_header_flag)) {<br>    ph_sao_luma_enabled_flag<br>    if( ChromaArrayType != 0 )<br>      ph_sao_chroma_enabled_flag<br>  }<br>...<br>} | <br><br><br><br>u(1)<br><br>u(1) |

Weighted Prediction (WP)

In one embodiment, the signalling of the weighted prediction is avoided in the slice header when the picture header is signalled in the slice header. In an equivalent way, the picture header is not signalled in the slice header when the signalling of the weighted prediction, is signalled in the slice header. In another equivalent way, the picture header is signalled in the slice header when the signalling of the weighted prediction is signalled in the picture header. In other words, the tool XXX mentioned above is WP.

As shown in Table 25, WP parameters can be signalled in the slice header when wp_info_in_ph_flag is set equal to 0 with the current syntax.

Table 25 illustrates an implementation of this embodiment where WP signalling is not authorized when the picture header is signalled in the slice header.

TABLE 25

Summary of WP signalling

| | wp_info_in_ph_flag = 1 | wp_info_in_ph_flag = 0 |
|---|---|---|
| picture_header_in_slice_header_flag = 1 | WP in Picture Header | Not Applicable |
| picture_header_in_slice_header_flag = 0 | WP in Picture Header | WP in Slice Header or not present |

When the picture header is in the slice header, as only one slice is present for the current picture, the information transmitted in slice or picture doesn't increase the flexibility for encoder or decoder as the parameters are the same. So to reduce the decoder implementation complexity it is better to have only one possible signaling of WP info to code the same coding possibility.

In an embodiment, the following condition is added in the semantics of wp_info_in_ph_flag:

"When slice headers referring to the PPS contain the PH syntax structure, it is a requirement of bitstream conformance that wp_info_in_ph_flag shall be equal to 1."

And/or

"When wp_info_in_ph_flag is equal to 0, the picture_header_in_slice_header_flag shall be equal to 0"

In an embodiment, the decoding WP parameters in the slice header is authorized only when the value of the flag picture_header_in_slice_header_flag is set equal to 0 as depicted in Table 26. In this table the pred_weight_table( ) function containing weighted prediction parameters can be decoded if WP information is signalled at slice level (wp_info_in_ph_flag equal to 0) and if the picture header is not transmitted in the slice header (picture_header_in_slice_header_flag equal to 0).

TABLE 26

Partial Slice header showing modification for WP

| | Descriptor |
|---|---|
| slice_header( ) {<br>  picture_header_in_slice_header_flag<br>  if( picture_header_in_slice_header_flag)<br>    picture_header_structure( )<br>...<br>  if( !wp_info_in_ph_flag && !picture_header_in_slice_header_flag && ( (<br>pps_weighted_pred_flag && slice_type = = P ) \|\|<br>      (pps_weighted_bipred_flag && slice_type = = B ) ) )<br>    pred_weight_table( )<br>...<br>} | <br>u(1) |

In an embodiment, the decoding WP parameters in the Picture header are systematically authorized when the value of the flag picture_header_in_slice_header_flag is set equal to 1 as depicted in Table 27. In this table the WP information can be decoded only if WP information is signalled in the picture header (wp_info_in_ph_flag equal to 1) or if the picture header is transmitted in the slice header (picture_header_in_slice_header_flag equal to 1).

TABLE 27

Partial Picture header showing modification for WP

| | Descriptor |
|---|---|
| picture_header_structure( ) { | |
| ... | |
|    if( ( pps_weighted_pred_flag \|\| pps_weighted_bipred_flag) && (wp_info_in_ph_flag\|\|<u>picture_header_in_slice_header_flag</u>) ) | |
|       pred_weight_table( ) | u(1) |
| .... | |
| } | |

ALF

In one embodiment, the signalling of ALF is avoided in the slice header when the picture header is signalled in the slice header. In an equivalent way, the picture header is not signalled in the slice header when the signalling of ALF, is signalled in the slice header. In another equivalent way, the picture header is signalled in the slice header when the signalling of ALF is signalled in the picture header. In other words, the tool XXX mentioned above is ALF.

Indeed, currently when the picture header is signalled in the slice header (picture_header_in_slice_header_flag=1) and when the ALF is signalled in the slice header (alf_info_in_ph_flag=0), all the parameters of the picture header should be parsed before obtaining the ALF APS ID. Consequently, it increases the complexity of the parsing for some streaming applications as all variables of PPS, SPS, picture header etc. should be keep in memory to parse the ALF APS ID.

Moreover, when the picture header is in the slice header, as only one slice is present for the current picture, the information transmitted in slice or picture doesn't increase the flexibility for encoder or decoder as the parameters are the same. So to reduce the decoder implementation complexity it is better to have only one possible signaling to code the same coding possibility. Table 28 illustrates this embodiment where ALF signalling is not authorized when the picture header is signalled in the slice header.

TABLE 28

Summary of ALF signalling

| | alf_info_in_ph_flag = 1 | alf_info_in_ph_flag = 0 |
|---|---|---|
| picture_header_in_slice_header_flag = 1 | ALF in Picture Header | Not Applicable |
| picture_header_in_slice_header_flag = 0 | ALF in Picture Header | ALF in Slice Header or not present |

In an embodiment, the following condition is added in the semantics of aif_info_in_ph_flag:
"When slice headers referring to the PPS contain the PH syntax structure, it is a requirement of bitstream conformance that alf_info_in_ph_flag shall be equal to 1."
And/or
"When alf_info_in_ph_flag is equal to 0, the picture_header_in_slice_header_flag shall be equal to 0"

In an embodiment, the decoding ALF parameters in the slice header is authorized only when the value of the flag picture_header_in_slice_header_flag is set equal to 0 as depicted in Table 29. In this table the ALF information of the slice header can be decoded only if ALF is enabled at SPS level (sps_alf_enabled_flag equal to 1) and if ALF information is signalled at slice level (alf_info_in_ph_flag equal to 0) and if the picture header is not transmitted in the slice header (picture_header_in_slice_header_flag equal to 0).

TABLE 29

Partial Slice header showing modification for ALF

| | Descriptor |
|---|---|
| slice_header( ) { | |
|   picture_header_in_slice_header_flag | u(1) |
|   if( picture_header_in_slice_header_flag ) | |
|     picture_header_structure( ) | |
| ... | |
|   if( sps_alf_enabled_flag && !alf_info_in_ph_flag && !picture_header_in_slice_header_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr enabled flag ) | |

TABLE 29-continued

Partial Slice header showing modification for ALF

| | Descriptor |
|---|---|
|           slice_cc_alf_cr_aps_id | u(3) |
| } | |

TABLE 29-continued

Partial Slice header showing modification for ALF

| | Descriptor |
|---|---|
|     } | |
|   } | |
| ... | |
| } | |

In an embodiment, the decoding ALF parameters in the Picture header is systematically authorized when the value of the flag picture_header_in_slice_header_flag is set equal to 1 as depicted in Table 30. In this table the ALF information of the slice header can be decoded only if ALF is enabled at SPS level (sps_alf_enabled_flag equal to 1) and if ALF information is signalled at picture level (alf_info_in_ph_flag equal to 1) or if the picture header is transmitted in the slice header (picture_header_in_slice_header_flag equal to 1).

TABLE 30

Partial Picture header showing modification for ALF

| | Descriptor |
|---|---|
| picture_header_structure( ) { | |
| ... | |
| if( sps_alf_enabled_flag && ( alf_info_in_ph_flag \|\| picture_header_in_slice_header_flag) ) { | |
|   ph_alf_enabled_flag | u(1) |
|   if( ph_alf_enabled_flag) { | |
|     ph_num_alf_aps_ids_luma | u(3) |
|     for( i = 0; i < ph_num_alf_aps_ids_luma; i++ ) | |
|       ph_alf_aps_id_luma[ i ] | u(3) |
|     if( ChromaArrayType != 0 ) | |
|       ph_alf_chroma_idc | u(2) |
|     if( ph_alf_chroma_idc > 0 ) | |
|       ph_alf_aps_id_chroma | u(3) |
|     if( sps_cc_alf_enabled_flag ) { | |
|       ph_cc_alf_cb_enabled_flag | u(1) |
|       if( ph_cc_alf_cb_enabled_flag ) | |
|         ph_cc_alf_cb_aps_id | u(3) |
|       ph_cc_alf_cr_enabled_flag | u(1) |
|       if( ph_cc_alf_cr_enabled_flag ) | |
|         ph_cc_alf_cr_aps_id | u(3) |
|       } | |
|     } | |
|   } | |
| } | |

All Tools/Parameters

In one embodiment, when the picture header is signalled in the slice header, all tools (and/or parameters) which can be signalled in the picture header or in the slice header are restricted to being signalled in the picture header. As mention in the above description, in an embodiment, the related tools are: QP delta information, reference picture lists, deblocking filter, SAO Weighted prediction and ALF. Other tools may be possible, however, where they are able to be signalled in both the slice and picture header.

This can be expressed by adding the following constraint: "When at least one of the flags rpl_info_in_ph_flag, dbf_info_in_ph_flag, sao_info_in_ph_flag, alf_info_in_ph_flag, wp_info_in_ph_flag, qp_delta_info_in_ph_flag is set equal to 0, the value of picture_header_in_slice_header_flag shall be equal to 0."

And/Or by adding:

"When picture_header_in_slice_header_flag is equal to 1, the flags rpl_info_in_ph_flag, dbf_info_in_ph_flag, sao_info_in_ph_flag, wp_info_in_ph_flag, qp_delta_info_in_ph_flag shall be equal to 1."

And/Or by adding to each XXX_info_in_ph_flag the following constraint:

"When slice headers referring to the PPS contain the PH syntax structure, it is a requirement of bitstream conformance that XXX_info_in_ph_flag shall be equal to 1."

When all these parameters are signalled in the same header it reduces the decoder implementation complexity as it is better to have only one possible signaling to code the same coding possibility.

Signalling Order Embodiment

In one alternatives embodiment of the previous ones related to ALF, the information related to ALF APS ID in the slice header is set before the picture header structure as depicted in Table 31. With this embodiment, when ALF is signalled in the slice header and when the picture header is signalled in the slice header, the APS ID can be obtained quickly without parsed all the parameters of the picture header.

TABLE 31

Partial Slice header showing modifications

| | Descriptor |
|---|---|
| slice_header( ) { | |
|   if( sps_alf_enabled_flag && !alf_info_in_ph_flag ) { | |
|     slice_alf_enabled_flag | u(1) |
|     if( slice_alf_enabled_flag) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |

TABLE 31-continued

Partial Slice header showing modifications

| | Descriptor |
|---|---|
|       slice_cc_alf_cr_enabled_flag | u(1) |
|       if( slice_cc_alf_cr_enabled_flag ) | |
|         slice_cc_alf_cr_aps_id | u(3) |
|       } | |
|     } | |
|   } | |
| picture_header_in_slice_header_flag | u(1) |
| if( picture_header_in_slice_header_flag ) | |
|   picture_header_structure( ) | |
| .... | |
| } | |

Number of Weights Embodiment

In an embodiment when the picture header is in the slice header, the number of weights for the weighted prediction for each list L0 L1 is decoded as depicted in the partial table of syntax element Table 32. Accordingly, the signalling of the number of weights may be restricted to the picture header.

TABLE 32

Partial Weighted prediction parameters syntax table

| | Descriptor |
|---|---|
| pred_weight_table( ) { | |
|   ... | |
|   if( wp_info_in_ph flag || picture_header_in_slice_header_flag ) | |
|     num_l0_weights | ue(v) |
|   ... | |
|   if( pps_weighted_bipred flag && ( wp_info_in_ph_flag|| picture_header_in_slice_header_flag) ) | |
|     num_l1_weights | ue(v) |
|   ... | |
| } | |

Summary of Embodiments where Information is Signalled in the Slice Header and not in the Picture Header In one embodiment, the signalling of an information which can be signalled into the picture header or in the slice header is signalled in the slice header and not in the picture header when the picture header is signalled in the slice header. In an equivalent way, the picture header is not signalled in the slice header when the signalling of an information, which can be signalled into the picture header or in the slice header, is signalled in the picture header. In another equivalent way, the picture header is signalled in the slice header when the signalling of an information, which can be signalled into the picture header or in the slice header, is signalled in the slice header. Table 33 illustrates this embodiment where a tool (or parameter) name is replaced by XXX. In this table, the signalling of parameters is not authorized in the picture header when the picture header is signalled in the slice header.

TABLE 33

Summary of a tool signalling.

| | xxx_info_in_ph_flag = 1 | xxx_info_in_ph_flag = 0 |
|---|---|---|
| picture_header_in_slice_header_flag = 1 | Not Applicable | XXX in Slice Header or not present |
| picture_header_in_slice_header_flag = 0 | XXX in Picture Header | XXX in Slice Header or not present |

In one embodiment, the following condition is added in the semantics of xxx_info_in_ph_flag:

"When slice headers referring to the PPS contain the PH syntax structure, it is a requirement of bitstream conformance that XXX_info_in_ph_flag shall be equal to 0."

And/or

"When XXX_info_in_ph_flag is equal to 1, the picture_header_in_slice_header_flag shall be equal to 0"

When the picture header is in the slice header this implies only one slice is present for the current picture. Thus, having the information transmitted or transmittable for both slice and picture doesn't increase the flexibility for encoder or decoder as the parameters will be the same. In other words, if the information is in the picture header, corresponding information in the slice header will be redundant. Similarly, if the information is in the slice header, corresponding information in the picture header will be redundant. Embodiments described herein simplify the decoder implementation by limiting the redundancies in the signaling of the same coding. In particular, in embodiments, the information is permitted to be in the slice header but not the picture header when the picture header is signalled in the slice header.

QP Delta

In one embodiment the tool XXX is the QP delta. In an embodiment, the decoding QP delta parameters in the slice header is authorized when the value of the flag picture_header_in_slice_header_flag is set equal to 1 as depicted in Table 33. In an equivalent way, picture_header_in_slice_header_flag is set equal to 0, when the QP delta parameters are signalled in the picture header as depicted in Table 33. In another equivalent way, the picture_header_in_slice_header_flag is set equal to 1, when the QP delta parameters are signalled in the slice header as depicted in Table 33. In this table the slice_qp_delta information of the slice header can be decoded if QP delta information is signalled at slice level (qp_delta_info_in_ph_flag equal to 0) or if the picture header is transmitted in the slice header (picture_header_in_slice_header_flag equal to 1).

This can be obtained by adding to the semantics:

"When slice headers referring to the PPS contain the PH syntax structure, it is a requirement of bitstream conformance that qp_delta_info_in_ph_flag shall be equal to 0."
And/or
"When qp_delta_info_in_ph_flag is equal to 1, the picture_header_in_slice_header_flag shall be equal to 0"

In an embodiment, the decoding QP delta parameters in the picture header is systematically avoided when the value of the flag picture_header_in_slice_header_flag is set equal to 1 as depicted in Table 35. In this table the QP delta information of the picture header can be decoded only if QP delta information is signalled in the picture header (qp_delta_info_in_ph_flag equal to 1) and if picture_header_in_slice_header_flag is set equal to 0.

RPL (Reference Picture List)

In one embodiment the tool XXX is the reference picture lists. In an embodiment, the decoding of reference picture lists parameters in the slice header is authorized only when the value of the flag picture_header_in_slice_header_flag is set equal to 1 as depicted in Table 33. In an equivalent way, picture_header_in_slice_header_flag is set equal to 0, when the reference picture lists parameters are signalled in the picture header as depicted in Table 33. In another equivalent way, the picture_header_in_slice_header_flag is set equal to 1, when the reference picture lists parameters are signalled in the slice header as depicted in Table 33. In this table, the ref_pic_lists( ) information of the slice header can be decoded if the reference picture lists information is signalled at slice level (rpl_info_in_ph_flag equal to 0) and if the picture header is transmitted in the slice header (picture_header_in_slice_header_flag equal to 1).

In an embodiment, the temporal parameters slice_collocated_from_l0_flag and slice_collocated_ref_idx can be decoded when the picture header is in the slice header as depicted in Table 34.

In an embodiment, the decoding of RPL parameters in the Picture header is systematically avoided when the value of the flag picture_header_in_slice_header_flag is set equal to 1 as depicted in Table 35. In this table the RPL information of the picture header can be decoded only if RPL information is signalled at picture level (rpl_info_in_ph_flag equal to 1) and if picture_header_in_slice_header_flag is set equal to 0.

In an embodiment, the temporal parameters ph_collocated_from_l0_flag and ph_collocated_ref_idx can't be decoded when the picture header is in the slice header as depicted in Table 35.

Deblocking Filter (DBF)

In one embodiment the tool XXX is the deblocking filter (DBF). In one alternative or additional embodiment, the DBF parameters in the slice header are authorized when the value of the flag picture_header_in_slice_header_flag is set equal to 1 as depicted in Table 33. In an equivalent way, picture_header_in_slice_header_flag is set equal to 0, when the DBF parameters are signalled in the picture header as depicted in Table 33. In another equivalent way, the picture_header_in_slice_header_flag is set equal to 1, when the DBF parameters are signalled in the slice header as depicted in Table 33. In this table the slice_deblocking_filter_override_flag flag of the slice header can be decoded if DBF information is signalled at slice level (dbf_info_in_ph_flag equal to 0) or if the picture header is transmitted in the slice header (picture_header_in_slice_header_flag equal to 1).

In an embodiment, the DBF parameters in the picture header are systematically avoided when the value of the flag picture_header_in_slice_header_flag is set equal to 1 as depicted in Table 35. In this table the DBF information of the picture header can be decoded only if DBF information is signalled in the picture header (dbf_info_in_ph_flag equal to 1) and if picture_header_in_slice_header_flag is equal to 0.

Sample Adaptive Offset (SAO)

In one embodiment the tool XXX is SAO (Sample Adaptive Offset). In one alternative or additional embodiment, the SAO parameters in the slice header are authorized only when the value of the flag picture_header_in_slice_header_flag is set equal to 1 as depicted in Table 33. In an equivalent way, picture_header_in_slice_header_flag is set equal to 0, when the SAO parameters are signalled in the picture header as depicted in Table 33. In another equivalent way, the picture_header_in_slice_header_flag is set equal to 1, when the SAO parameters are signalled in the slice header as depicted in Table 33. In this table the slice_sao_luma_flag flag of the slice header can be decoded if SAO information is signalled at slice level (sao_info_in_ph_flag equal to 0) and if the picture header is transmitted in the slice header (picture_header_in_slice_header_flag equal to 1).

In an embodiment, the SAO parameters in the picture header are systematically avoided when the value of the flag picture_header_in_slice_header_flag is set equal to 1 as depicted in Table 35. In this table the SAO information of the picture header can be decoded only if SAO information is signalled in the picture header (sao_info_in_ph_flag equal to 1) and if picture_header_in_slice_header_flag is set equal to 0.

WP (Weighted Prediction)

In one embodiment the tool XXX is the WP (Weighted prediction). In an embodiment, the WP parameters in the slice header are authorized only when the value of the flag picture_header_in_slice_header_flag is set equal to 1 as depicted in Table 33. In an equivalent way, picture_header_in_slice_header_flag is set equal to 0, when the WP parameters are signalled in the picture header as depicted in Table 33. In another equivalent way, the picture_header_in_slice_header_flag is set equal to 1, when the WP parameters are signalled in the slice header as depicted in Table 33. In this table the pred_weight_table( ) function containing weighted prediction parameters can be decoded if WP information is signalled at slice level (wp_info_in_ph_flag equal to 0) or if the picture header is transmitted in the slice header (picture_header_in_slice_header_flag equal to 1).

In one additional embodiment, the decoding WP parameters in the Picture header is systematically avoided when the value of the flag picture_header_in_slice_header_flag is set equal to 1 as depicted in Table 35. In this table the WP information can be decoded only if WP information is signalled in the picture header (wp_info_in_ph_flag equal to 1) and if picture_header_in_slice_header_flag is set equal to 0.

ALF (Adaptive Loop Filter)

In one embodiment the tool XXX is the ALF (Adaptive loop filter). In an embodiment, the decoding ALF parameters in the slice header is authorized only when the value of the flag picture_header_in_slice_header_flag is set equal to 1 as depicted in Table 33. In an equivalent way, picture_header_in_slice_header_flag is set equal to 0, when the ALF parameters are signalled in the picture header as depicted in Table 33. In another equivalent way, the picture_header_in_slice_header_flag is set equal to 1, when the ALF parameters are signalled in the slice header as depicted in Table 33 In this table the ALF information of the slice header can be decoded only if ALF is enabled at SPS level (sps_alf_enabled_flag equal to 1) and if ALF information is signalled at slice level (alf_info_in_ph_flag equal to 0) or if the picture header is transmitted in the slice header (picture_header_in_slice_header_flag equal to 1).

In an embodiment, the decoding ALF parameters in the picture header is systematically avoided when the value of the flag picture_header_in_slice_header_flag is set equal to 1 as depicted in Table 35. In this table the ALF information of the slice header can be decoded only if ALF is enabled at SPS level (sps_alf_enabled_flag equal to 1) and if ALF information is signalled at picture level (alf_info_in_ph_flag equal to 1) and if picture_header_in_slice_header_flag is set equal to 0.

TABLE 34

| Partial Slice header showing modifications | |
|---|---|
| | Descriptor |
| slice_header( ) { | |
|   picture_header_in_slice_header_flag | u(1) |
|   if( picture_header_in_slice_header_flag ) | |
|     picture_header_structure( ) | |
| ... | |
|   if( sps_alf_enabled_flag && (!alf_info_in_ph_flag \|\| picture_header_in_slice_header_flag) ) { | |
|     slice_alf_enabled_flag | u(1) |
|     if( slice_alf_enabled_flag ) { | |
|     ... | |
|     } | |
|   } | |
| ... | |
|   if( (!rpl_info_in_ph_flag \|\| picture_header_in_slice_header_flag) && ( ( nal_unit_type != IDR_W_RADL && nal_unit_type != | |
|     IDR_N_LP ) \|\| sps_idr_rpl_present_flag ) ) | |
|     ref_pic_lists( ) | |
|   if( ( rpl_info_in_ph_flag && ! picture_header_in_slice_header_flag) \|\| ( ( nal_unit_type != IDR_W_RADL && nal_unit_type != | |
|     IDR_N_LP ) \|\| sps_idr_rpl_present_flag ) ) && | |
|     ( slice type != I && num_ref_entries[ 0 ][ RplsIdx[ 0 ] ] > 1) \|\| | |
|     ( slice type == B && num_ref_entries[ 1 ][ RplsIdx[ 1 ] ] > 1 ) ) { | |
|     num_ref_idx_active_override_flag | u(1) |
|     if( num_ref_idx_active_override_flag ) | |
|       for( i = 0; i < ( slice_type == B ? 2: 1); i++ ) | |
|         if( num_ref_entries[ i ][ RplsIdx[ i ] ] > 1 ) | |
|           num_ref_idx_active_minus1[ i ] | ue(v) |
|   } | |
| ... | |
|   if( ph_temporal_mvp_enabled_flag && (!rpl_info_in_ph_flag \|\| picture_header_in_slice_header_flag) ) { | |
|     if( slice_type == B ) | |
|       slice_collocated_from_l0_flag | u(1) |
|     if( ( slice_collocated_from_l0_flag && NumRefIdx Active [ 0 ] > 1 ) \|\| | |
|       (! slice_collocated_from_l0_flag && NumRefIdxActive[ 1 ] > 1 ) ) | |
|       slice_collocated_ref_idx | ue(v) |
|   } | |
|   if( (!wp_info_in_ph_flag \|\| picture_header_in_slice_header_flag) && ( ( pps_weighted_pred_flag && slice type == P ) \|\| | |
|     ( pps_weighted_bipred_flag && slice_type == B ) ) ) | |
|     pred_weight_table( ) | |
|   } | |
|   if( (!qp_delta_info_in_ph_flag \|\| picture_header_in_slice_header_flag) ) | |
|     slice_qp_delta | se(v) |
|   ... | |
|   if( sps_sao_enabled_flag && ( !sao_info_in_ph_flag \|\| picture_header_in_slice_header_flag) ) { | |
|     slice_sao_luma_flag | u(1) |
|     if( ChromaArrayType != 0 ) | |
|       slice_sao_chroma_flag | u(1) |
|   } | |
|   if( deblocking_filter_override_enabled_flag && ( !dbf_info_in_ph_flag \|\| picture_header_in_slice_header_flag) ) | |
|     slice_deblocking_filter_override_flag | u(1) |
|   ... | |
| } | |

TABLE 35

Partial Picture header showing modifications

| | Descriptor |
|---|---|
| picture_header_structure( ) { | |
| ... | |
|   if( sps_alf_enabled_flag && ( alf_info_in_ph_flag && !picture_header_in_slice_header_flag) ) { | |
|     ph_alf_enabled_flag | u(1) |
|     if( ph_alf_enabled_flag ) { | |
|   ... | |
|     } | |
|   } | |
| ... | |
|   if( rpl_info_in_ph flag && ! picture_header_in_slice_header_flag) | |
|     ref_pic_lists( ) | |
|   ... | |
|     if( ph_temporal_mvp_enabled_flag && rpl_info_in_ph_flag && !picture_header_in_slice_header_flag ) { | |
|       ph_collocated_from_l0_flag | u(1) |
|       if( ( ph_collocated_from_l0_flag && | |
|         num_ref_entries[ 0 ][ RplsIdx[ 0 ] ] > 1 ) || | |
|         ( !ph_collocated_from_l0_flag && | |
|         num_ref_entries[ 1 ][ RplsIdx[ 1 ] ] > 1 ) ) | |
|         ph_collocated_ref_idx | ue(v) |
|     } | |
|   ... | |
|     if( ( pps_weighted_pred_flag || pps_weighted_bipred_flag ) && wp_info_in_ph_flag && !picture_header_in_slice_header_flag) | |
|       pred_weight_table( ) | |
|   } | |
|   if( qp_delta_info_in_ph_flag && !picture_header_in_slice_header_flag ) | |
|     ph_qp_delta | se(v) |
| ... | |
|   if( sps_sao_enabled_flag && sao_info_in_ph_flag && !picture_header_in_slice_header_flag ) { | |
|     ph_sao_luma_enabled_flag | u(1) |
|     if( ChromaArrayType != 0 ) | |
|       ph_sao_chroma_enabled_flag | u(1) |
|   } | |
| ... | |
|   if( deblocking_filter_override_enabled_flag && dbf_info_in_ph_flag && !picture_header_in_slice_header_flag ) { | |
|     ph_deblocking_filter_override_flag | u(1) |
|   ... | |
|   } | |
| ... | |
| } | |

All Tools/Parameters

In an embodiment, when the picture header is signalled in the slice header, all tools (and/or parameters) which can be signalled in the picture header or in the slice header are signalled in the slice header. As mention in the above description in an embodiment, the related tools are: QP delta information, reference picture lists, deblocking filter, SAO Weighted prediction and ALF. Other tools may be possible, however, where they are able to be signalled in both the slice and picture header.

This can be expressed by adding the following constraint:

"When at least one of the flags rpl_info_in_ph_flag, dbf_info_in_ph_flag, sao_info_in_ph_flag, alf_info_in_ph_flag, wp_info_in_ph_flag, qp_delta_info_in_ph_flag is set equal to 1, the value of picture_header_in_slice_header_flag shall be equal to 0."

And/Or by adding:

"When picture_header_in_slice_header_flag is equal to 1, the flags rpl_info_in_ph_flag, dbf_info_in_ph_flag, sao_info_in_ph_flag, wp_info_in_ph_flag, qp_delta_info_in_ph_flag shall be equal to 0."

And/Or by adding to each XXX_info_in_ph_flag the following constraint:

"When slice headers referring to the PPS contain the PH syntax structure, it is a requirement of bitstream conformance that XXX_info_in_ph_flag shall be equal to 0."

When all these parameters are signalling in the same header it reduces the decoder implementation complexity as it is better to have only one possible signaling for tools or parameters where they will inevitably have the same values or properties.

Implementations

Figure 10:
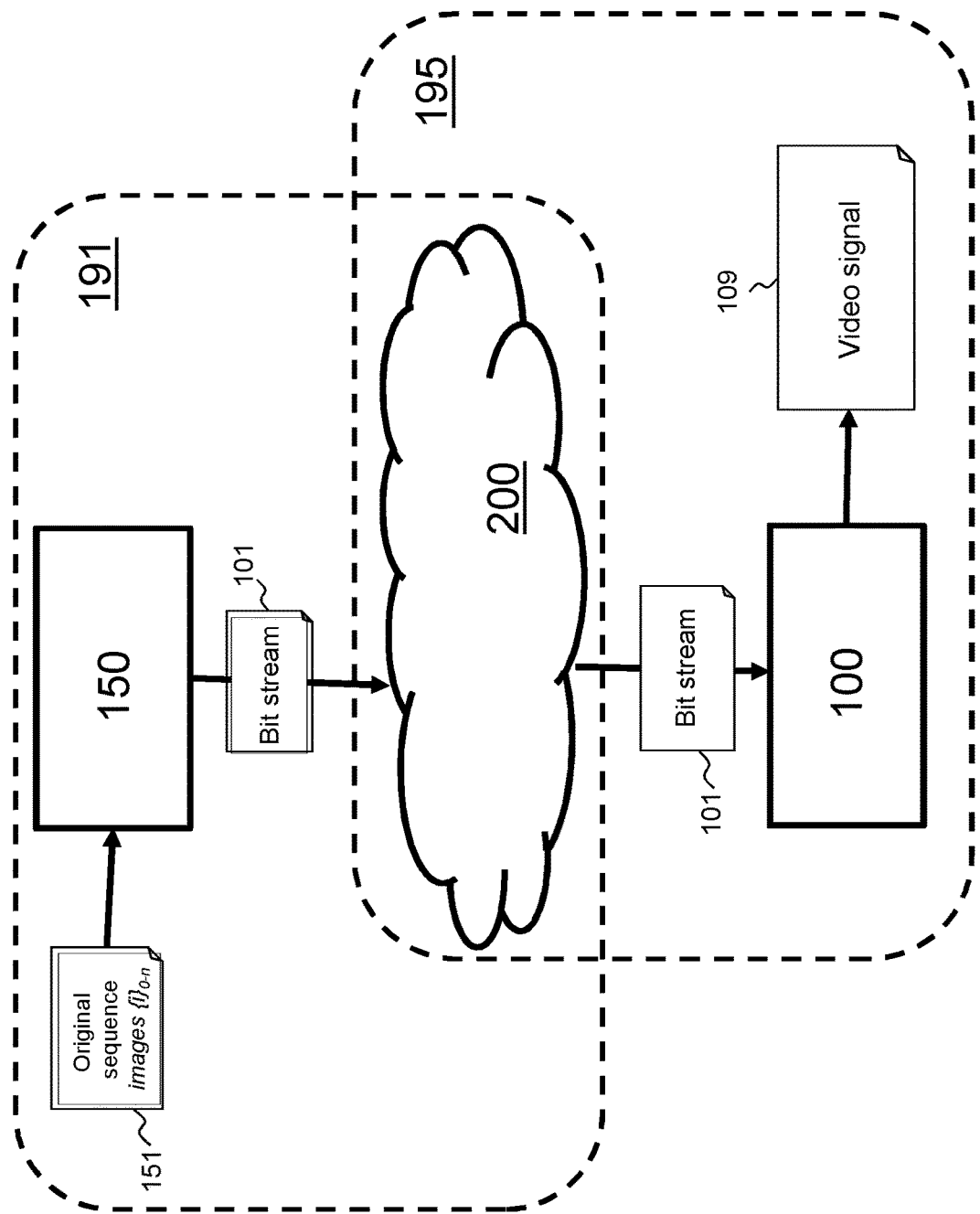
FIG. 10 is a diagram showing a system comprising an encoder or a decoder and a communication network according to embodiments of the present invention.

FIG. 10 shows a system 191, 195 comprising at least one of an encoder 150 or a decoder 100 and a communication network 199 according to embodiments of the present invention. According to an embodiment, the system 195 is for processing and providing a content (for example, a video and audio content for displaying/outputting or streaming video/audio content) to a user, who has access to the decoder 100, for example through a user interface of a user terminal comprising the decoder 100 or a user terminal that is communicable with the decoder 100. Such a user terminal may be a computer, a mobile phone, a tablet or any other type of a device capable of providing/displaying the (provided/streamed) content to the user. The system 195 obtains/receives a bitstream 101 (in the form of a continuous stream or a signal—e.g. while earlier video/audio are being displayed/output) via the communication network 199. According to an embodiment, the system 191 is for processing a content and storing the processed content, for example a video and audio content processed for displaying/outputting/streaming at a later time. The system 191 obtains/receives a content comprising an original sequence of images 151, which is received and processed (including filtering with a deblocking filter according to the present invention) by the encoder 150, and the encoder 150 generates a bitstream 101 that is to be communicated to the decoder 100 via a communication network 191. The bitstream 101 is then communicated to the decoder 100 in a number of ways, for example it may be generated in advance by the encoder 150 and stored as data in a storage apparatus in the communication network 199 (e.g. on a server or a cloud storage) until a user requests the content (i.e. the bitstream data) from the storage apparatus, at which point the data is communicated/streamed to the decoder 100 from the storage apparatus. The system 191 may also comprise a content providing apparatus for providing/streaming, to the user (e.g. by communicating data for a user interface to be displayed on a user terminal), content information for the content stored in the storage apparatus (e.g. the title of the content and other meta/storage location data for identifying, selecting and requesting the content), and for receiving and processing a user request for a content so that the requested content can be delivered/streamed from the storage apparatus to the user terminal. Alternatively, the encoder 150 generates the bitstream 101 and communicates/streams it directly to the decoder 100 as and when the user requests the content. The decoder 100 then receives the bitstream 101 (or a signal) and performs filtering with a deblocking filter according to the invention to obtain/generate a video signal 109 and/or audio signal, which is then used by a user terminal to provide the requested content to the user.

Any step of the method/process according to the invention or functions described herein may be implemented in hardware, software, firmware, or any combination thereof. If implemented in software, the steps/functions may be stored on or transmitted over, as one or more instructions or code or program, or a computer-readable medium, and executed by one or more hardware-based processing unit such as a programmable computing machine, which may be a PC ("Personal Computer"), a DSP ("Digital Signal Processor"), a circuit, a circuitry, a processor and a memory, a general purpose microprocessor or a central processing unit, a microcontroller, an ASIC ("Application-Specific Integrated Circuit"), a field programmable logic arrays (FPGAs), or other equivalent integrated or discrete logic circuitry. Accordingly, the term "processor" as used herein may refer to any of the foregoing structure or any other structure suitable for implementation of the techniques describe herein.

Embodiments of the present invention can also be realized by wide variety of devices or apparatuses, including a wireless handset, an integrated circuit (IC) or a set of JCs (e.g. a chip set). Various components, modules, or units are described herein to illustrate functional aspects of devices/apparatuses configured to perform those embodiments, but do not necessarily require realization by different hardware units. Rather, various modules/units may be combined in a codec hardware unit or provided by a collection of interoperative hardware units, including one or more processors in conjunction with suitable software/firmware.

Embodiments of the present invention can be realized by a computer of a system or apparatus that reads out and executes computer executable instructions (e.g., one or more programs) recorded on a storage medium to perform the modules/units/functions of one or more of the above-described embodiments and/or that includes one or more processing unit or circuits for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more processing unit or circuits to perform the functions of one or more of the above-described embodiments. The computer may include a network of separate computers or separate processing units to read out and execute the computer executable instructions. The computer executable instructions may be provided to the computer, for example, from a computer-readable medium such as a communication medium via a network or a tangible storage medium. The communication medium may be a signal/bitstream/carrier wave. The tangible storage medium is a "non-transitory computer-readable storage medium" which may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. At least some of the steps/functions may also be implemented in hardware by a machine or a dedicated component, such as an FPGA ("Field-Programmable Gate Array") or an ASIC ("Application-Specific Integrated Circuit").

Figure 11:
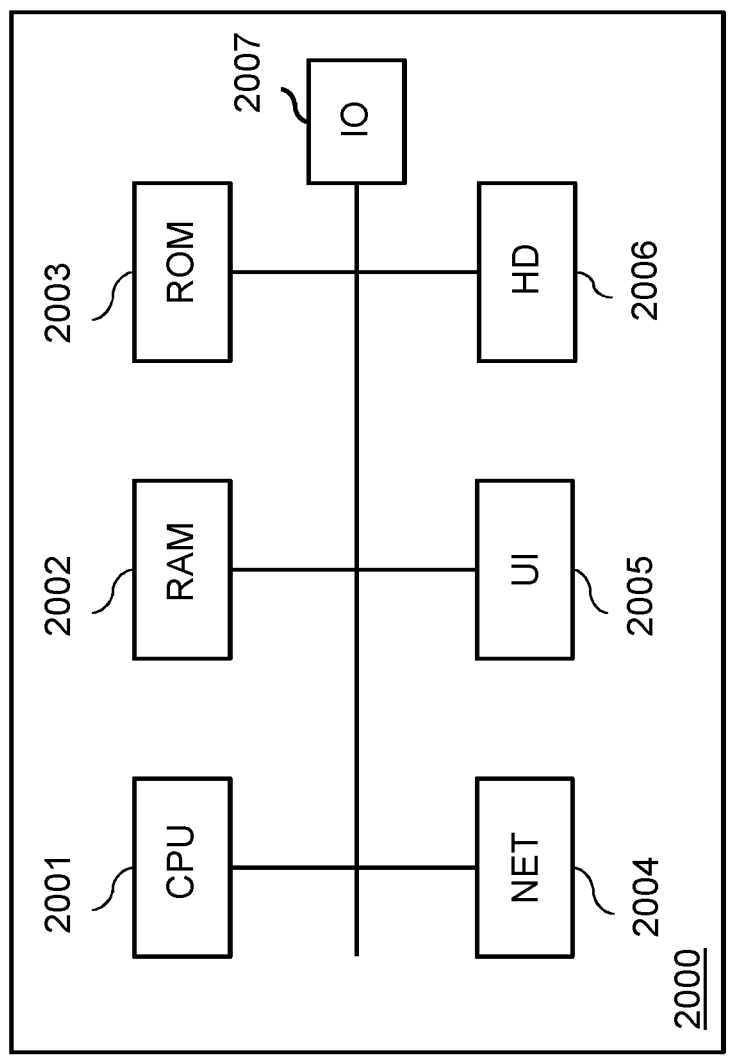
FIG. 11 is a schematic block diagram of a computing device for implementation of one or more embodiments of the invention.

FIG. 11 is a schematic block diagram of a computing device 2000 for implementation of one or more embodiments of the invention. The computing device 2000 may be a device such as a micro-computer, a workstation or a light portable device. The computing device 2000 comprises a communication bus connected to: —a central processing unit (CPU) 2001, such as a microprocessor; —a random access memory (RAM) 2002 for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example; —a read only memory (ROM) 2003 for storing computer programs for implementing embodiments of the invention; —a network interface (NET) 2004 is typically connected to a communication network over which digital data to be processed are transmitted or received. The network interface (NET) 2004 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 2001; —a user interface (UI) 2005 may be used for receiving inputs from a user or to display information to a user; —a hard disk (HD) 2006 may be provided as a mass storage device; —an Input/Output module (IO) 2007 may be used for receiving/sending data from/to external devices such as a video source or display. The executable code may be stored either in the ROM 2003, on the HD 2006 or on a removable digital medium such as, for example a disk. According to a variant, the executable code of the programs can be received by means of a communication network, via the NET 2004, in order to be stored in one of the storage means of the communication device 2000, such as the HD 2006, before being executed. The CPU 2001 is adapted to control and direct the execution of the instructions or portions of software code of the program or programs according to embodiments of the invention, which instructions are stored in one of the aforementioned storage means. After powering on, the CPU 2001 is capable of executing instructions from main RAM memory 2002 relating to a software application after those instructions have been loaded from the program ROM 2003 or the HD 2006, for example. Such a software application, when executed by the CPU 2001, causes the steps of the method according to the invention to be performed.

It is also understood that according to another embodiment of the present invention, a decoder according to an aforementioned embodiment is provided in a user terminal such as a computer, a mobile phone (a cellular phone), a table or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such examples are provided below with reference to FIGS. 11 and 12.

Network Camera

FIG. 11 is a diagram illustrating a network camera system 2100 including a network camera 2102 and a client apparatus 2104.

The network camera 2102 includes an imaging unit 2106, an encoding unit 2108, a communication unit 2110, and a control unit 2112.

The network camera 2102 and the client apparatus 2104 are mutually connected to be able to communicate with each other via the network 200.

The imaging unit 2106 includes a lens and an image sensor (e.g., a charge coupled device (CCD) or a complementary metal oxide semiconductor (CMOS)), and captures an image of an object and generates image data based on the image. This image can be a still image or a video image.

The encoding unit 2108 encodes the image data by using said encoding methods described above The communication unit 2110 of the network camera 2102 transmits the encoded image data encoded by the encoding unit 2108 to the client apparatus 2104.

Further, the communication unit 2110 receives commands from client apparatus 2104. The commands include commands to set parameters for the encoding of the encoding unit 2108.

The control unit 2112 controls other units in the network camera 2102 in accordance with the commands received by the communication unit 2110.

The client apparatus 2104 includes a communication unit 2114, a decoding unit 2116, and a control unit 2118.

The communication unit 2114 of the client apparatus 2104 transmits the commands to the network camera 2102.

Further, the communication unit 2114 of the client apparatus 2104 receives the encoded image data from the network camera 2102.

The decoding unit 2116 decodes the encoded image data by using said decoding methods described above.

The control unit 2118 of the client apparatus 2104 controls other units in the client apparatus 2104 in accordance with the user operation or commands received by the communication unit 2114.

The control unit 2118 of the client apparatus 2104 controls a display apparatus 2120 so as to display an image decoded by the decoding unit 2116.

The control unit 2118 of the client apparatus 2104 also controls a display apparatus 2120 so as to display GUI (Graphical User Interface) to designate values of the parameters for the network camera 2102 includes the parameters for the encoding of the encoding unit 2108.

The control unit 2118 of the client apparatus 2104 also controls other units in the client apparatus 2104 in accordance with user operation input to the GUI displayed by the display apparatus 2120.

The control unit 2119 of the client apparatus 2104 controls the communication unit 2114 of the client apparatus 2104 so as to transmit the commands to the network camera 2102 which designate values of the parameters for the network camera 2102, in accordance with the user operation input to the GUI displayed by the display apparatus 2120.

Smart Phone

Figure 12:
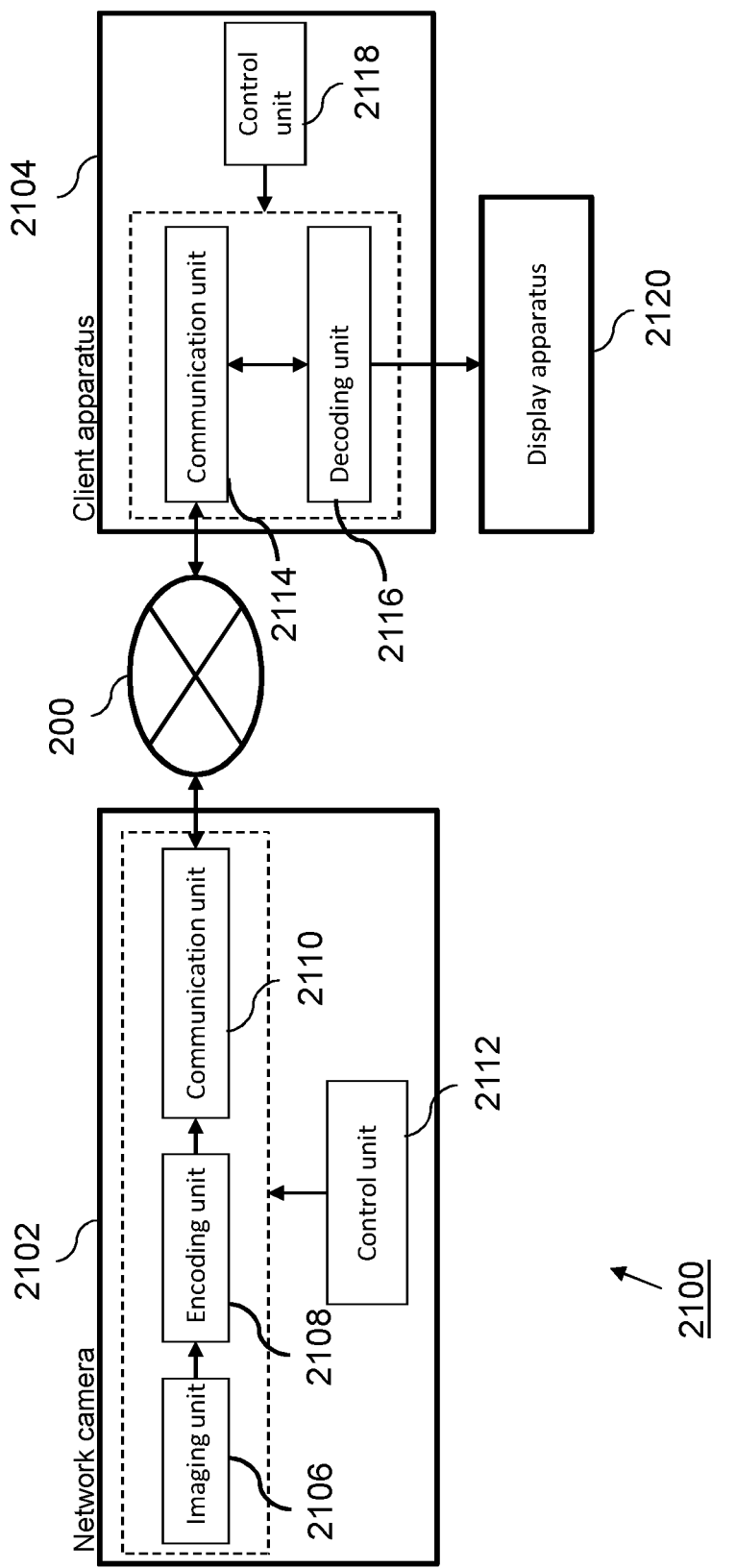
FIG. 12 is a diagram illustrating a network camera system.
Figure 13:
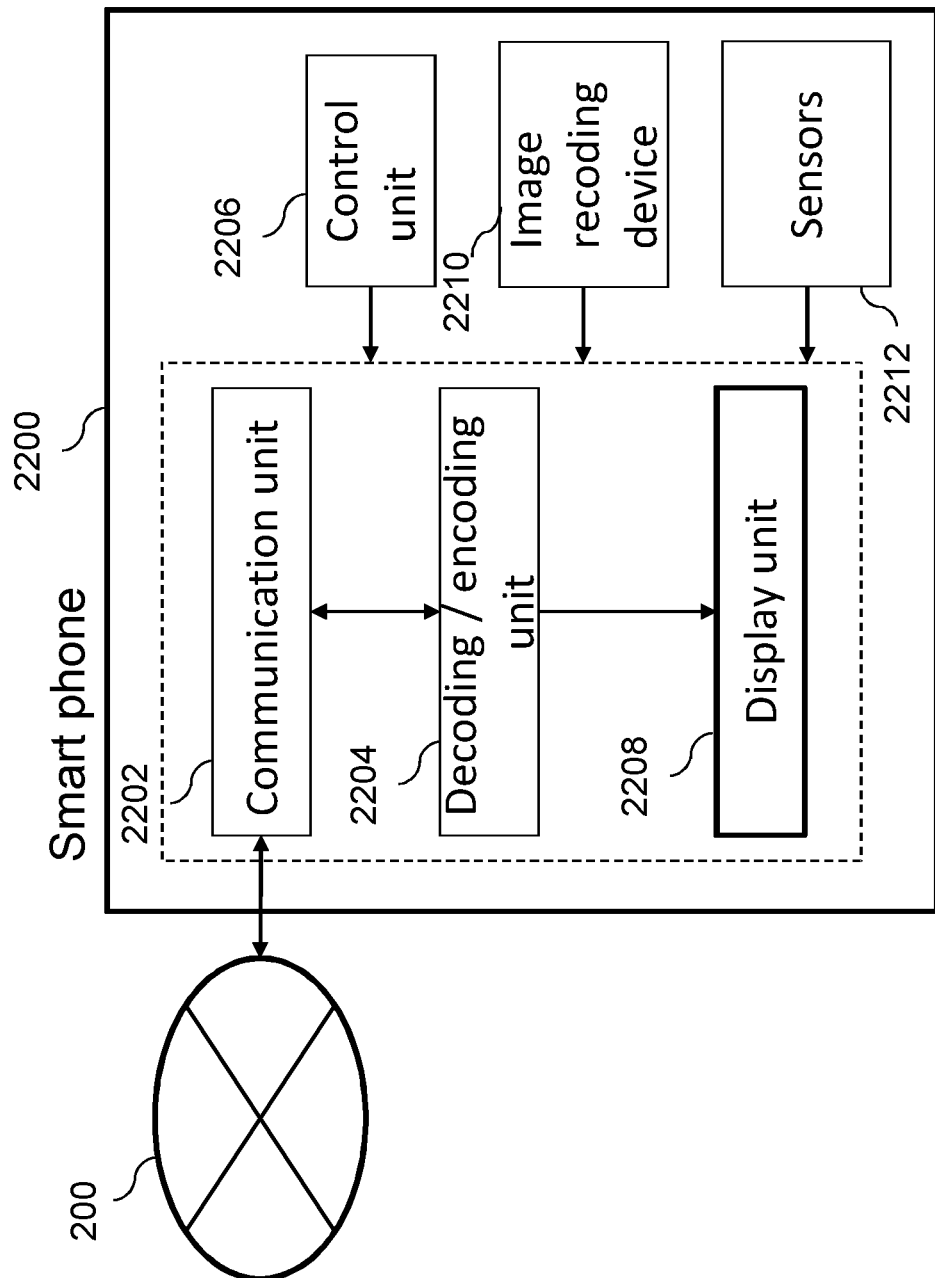
FIG. 13 is a diagram illustrating a smart phone.

FIG. 12 is a diagram illustrating a smart phone 2200.

The smart phone 2200 includes a communication unit 2202, a decoding unit 2204, a control unit 2206, display unit 2208, an image recording device 2210 and sensors 2212.

the communication unit 2202 receives the encoded image data via network 200.

The decoding unit 2204 decodes the encoded image data received by the communication unit 2202.

The decoding unit 2204 decodes the encoded image data by using said decoding methods described above.

The control unit 2206 controls other units in the smart phone 2200 in accordance with a user operation or commands received by the communication unit 2202.

For example, the control unit 2206 controls a display unit 2208 so as to display an image decoded by the decoding unit 2204.

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, for example a flag or data indicative of the result, so that the indicated or determined/inferred result can be used in the processing instead of actually performing the comparison, determination, assessment, selection, execution, performing, or consideration, for example during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

Reference numerals appearing in the claims are by way of illustration only and shall have no limiting effect on the scope of the claims.

The invention claimed is:

1. A method of decoding video data from a bitstream, the bitstream comprising (a) a picture parameter set, (b) a picture header syntax structure comprising syntax elements to be used when decoding one or more slices, and (c) a slice header comprising syntax elements to be used when decoding a slice, wherein the method comprises:
decoding syntax elements; and
decoding the video data from said bitstream using the decoded syntax elements,
wherein the syntax elements comprise (a) a first flag indicating whether the picture header syntax structure is present in the slice header, and (b) a second flag which is in the picture parameter set,
wherein in a case where the second flag has a first value, the second flag indicates that Adaptive Loop Filter (ALF) information could be present in the picture header syntax structure and is not present in the slice header referring to the picture parameter set that does not contain the picture header syntax structure, and in a case where the second flag has a second value different from the first value, the second flag indicates that ALF information is not present in the picture header syntax structure and could be present in the slice header referring to the picture parameter set,
wherein in a case where the second flag has the first value, the first flag shall have a value that indicates that the picture header syntax structure is not present in the slice header, and
wherein the ALF information comprises an adaptation parameter set id for adaptive loop filter (ALF), and an adaptation parameter set (APS) indicated by the adaptation parameter set id includes a third flag which indicates for luma if clipping indexes related to ALF are to be decoded.

2. A method of decoding video data, comprising:
receiving a bitstream comprising (a) a picture parameter set (b) a picture header syntax structure comprising syntax elements to be used when decoding one or more slices, and (c) a slice header comprising syntax elements to be used when decoding a slice; and
decoding the video data from the bitstream,
wherein the syntax elements comprise (a) a first flag indicating whether the picture header syntax structure is present in the slice header or not, and (b) a second flag, which is in the picture parameter set,
wherein in a case where the second flag has a first value, the second flag indicates that Adaptive Loop Filter (ALF) information could be present in the picture header syntax structure and is not present in the slice header referring to the picture parameter set that does not contain the picture header syntax structure, and in a case where the second flag has a second value different from the first value, the second flag indicates that ALF information is not present in the picture header syntax structure and could be present in the slice header referring to the picture parameter set,
wherein in a case where the second flag has the first value, the first flag shall have a value that indicates that the picture header syntax structure is not present in the slice header, and
wherein the ALF information comprises an adaptation parameter set id for adaptive loop filter (ALF), and an adaptation parameter set (APS) indicated by the adaptation parameter set id includes a third flag which indicates for luma if clipping indexes related to ALF are to be decoded.

3. A method of encoding video data into a bitstream, the bit-stream comprising (a) a picture parameter set, (b) a picture header syntax structure comprising syntax elements to be used when decoding one or more slices, and (c) a slice header comprising syntax elements to be used when decoding a slice, wherein the method comprises:
encoding the video data using syntax elements,
wherein the syntax elements comprise (a) a first flag indicating whether the picture header syntax structure is present in the slice header or not, and (b) a second flag, which is in the picture parameter set,
wherein in a case where the second flag has a first value, the second flag indicates that Adaptive Loop Filter (ALF) information could be present in the picture header syntax structure and is not present in the slice header referring to the picture parameter set that does not contain the picture header syntax structure, and in a case where the second flag has a second value different from the first value, the second flag indicates that ALF information is not present in the picture header syntax structure and could be present in the slice header referring to the picture parameter set,
wherein in a case where the second flag has the first value, the first flag shall have a value indicating that the picture header is not present in the slice header, and
wherein the ALF information comprises an adaptation parameter set id for adaptive loop filter (ALF), and an adaptation parameter set (APS) indicated by the adaptation parameter set id includes a third flag which indicates for luma if clipping indexes related to ALF are to be decoded.

4. A device for decoding video data from a bitstream, the bitstream comprising (a) a picture parameter set, (b) a picture header syntax structure comprising syntax elements to be used when decoding one or more slices, and (c) a slice header comprising syntax elements to be used when decoding a slice, wherein the device is configured to:
decode syntax elements; and
wherein the syntax elements comprise (a) a first flag indicating whether the picture header syntax structure is present in the slice header or not, and (b) a second flag, which is in the picture parameter set,
wherein in a case where the second flag has a first value, the second flag indicates that Adaptive Loop Filter (ALF) information could be present in the picture header syntax structure and is not present in the slice header referring to the picture parameter set that does not contain the picture header syntax structure, and in a case where the second flag has a second value different from the first value, the second flag indicates that ALF information is not present in the picture header syntax structure and could be present in the slice header referring to the picture parameter set,
wherein in a case where the second flag has the first value, the first flag shall have a value that indicates that the picture header syntax structure is not present in the slice header, and
wherein the ALF information comprises an adaptation parameter set id for adaptive loop filter (ALF), and an adaptation parameter set (APS) indicated by the adaptation parameter set id includes a third flag which indicates for luma if clipping indexes related to ALF are to be decoded.

5. A device for encoding video data into a bitstream, the bitstream comprising (a) a picture parameter set, (b) a picture header syntax structure comprising syntax elements to be used when decoding one or more slices, and (c) a slice header comprising syntax elements to be used when decoding a slice, wherein the device is configured to:
encode the video data using syntax elements,
wherein the syntax elements comprise (a) a first flag indicating whether the picture header syntax structure is present in the slice header or not, and (b) a second flag, which is in the picture parameter set,
wherein in a case where the second flag has a first value, the second flag indicates that Adaptive Loop Filter (ALF) information could be present in the picture header syntax structure and is not present in the slice header referring to the picture parameter set that does not contain the picture header syntax structure, and in a case where the second flag has a second value different from the first value, the second flag indicates that ALF information is not present in the picture header syntax structure and could be present in the slice header referring to the picture parameter set,
wherein in a case where the second flag has the first value, the first flag shall have a value that indicates that the picture header syntax structure is not present in the slice header, and
wherein the ALF information comprises an adaptation parameter set id for adaptive loop filter (ALF), and an adaptation parameter set (APS) indicated by the adaptation parameter set id includes a third flag which indicates for luma if clipping indexes related to ALF are to be decoded.

6. A device for decoding video data, configured to:
receive a bitstream comprising (a) a picture parameter set, (b) a picture header syntax structure comprising syntax elements to be used when decoding one or more slices, (c) a slice header comprising syntax elements to be used when decoding a slice; and
decode the video data from the bitstream,
wherein the syntax elements comprise (a) a first flag indicating whether the picture header syntax structure is present in the slice header or not, and (b) a second flag, which is in the picture parameter set,
wherein in a case where the second flag has a first value, the second flag indicates that Adaptive Loop Filter (ALF) information could be present in the picture header syntax structure and is not present in the slice header referring to the picture parameter set that does not contain the picture header syntax structure, and in a case where the second flag has a second value different from the first value, the second flag indicates that ALF information is not present in the picture header syntax structure and could be present in the slice header referring to the picture parameter set,
wherein in a case where the second flag has the first value, the first flag shall have a value that indicates that the picture header syntax structure is not present in the slice header,
and
wherein the ALF information comprises an adaptation parameter set id for adaptive loop filter (ALF), and an adaptation parameter set (APS) indicated by the adaptation parameter set id includes a third flag which indicates for luma if clipping indexes related to ALF are to be decoded.

7. A non-transitory computer-readable medium storing a computer program comprising program instructions adapted to perform, when executed by one or more processors a method of decoding video data from a bitstream, the bitstream comprising (a) a picture parameter set, (b) a picture header syntax structure comprising syntax elements to be used when decoding one or more slices, and (c) a slice header comprising syntax elements to be used when decoding a slice, wherein the method comprising:
decoding syntax elements; and
decoding the video data from the bitstream using the decoded syntax elements,
wherein the syntax elements comprise (a) a first flag indicating whether the picture header syntax structure is present in the slice header or not, and (b) a second flag, which is in the picture parameter set,
wherein in a case where the second flag has a first value, the second flag indicates that Adaptive Loop Filter (ALF) information could be present in the picture header syntax structure and is not present in the slice header referring to the picture parameter set that does not contain the picture header syntax structure, and in a case where the second flag has a second value different from the first value, the second flag indicates that ALF information is not present in the picture header syntax structure and could be present in the slice header referring to the picture parameter set,
wherein in a case where the second flag has the first value, the first flag shall have a value that indicates that the picture header syntax structure is not present in the slice header, and
wherein the ALF information comprises an adaptation parameter set id for adaptive loop filter (ALF), and an adaptation parameter set (APS) indicated by the adaptation parameter set id includes a third flag which indicates for luma if clipping indexes related to ALF are to be decoded.

8. A non-transitory computer-readable medium storing a computer program comprising program instructions adapted to perform, when executed by one or more processors, a method of decoding video data, the method comprising:
receiving a bitstream comprising (a) a picture parameter set, (b) a picture header syntax structure comprising syntax elements to be used when decoding one or more slices, and (c) a slice header comprising syntax elements to be used when decoding a slice; and
decoding the video data from the bitstream,
wherein the syntax elements comprise (a) a first flag indicating whether the picture header syntax structure is present in the slice header or not, and (b) a second flag, which is in the picture parameter set,
wherein in a case where the second flag has a first value, the second flag indicates that Adaptive Loop Filter (ALF) information could be present in the picture header syntax structure and is not present in the slice header referring to the picture parameter set that does not contain the picture header syntax structure, and in a case where the second flag has a second value different from the first value, the second flag indicates that ALF information is not present in the picture header syntax structure and could be present in the slice header referring to the picture parameter set wherein in a case where the second flag has the first value, the first flag shall have a value that indicates that the picture header syntax structure is not present in the slice header, and wherein the ALF information comprises an adaptation parameter set id for adaptive loop filter (ALF), and an adaptation parameter set (APS) indicated by the adaptation parameter set id includes a third flag which indicates for luma if clipping indexes related to ALF are to be decoded.

9. A non-transitory computer-readable medium storing a computer program comprising program instructions adapted to perform, when executed by one or more processors a method of encoding video data into a bitstream, the bitstream comprising (a) a picture parameter set, (b) a picture header syntax structure comprising syntax elements to be used when decoding one or more slices, and (c) a slice header comprising syntax elements to be used when decoding a slice, wherein the method comprises:

encoding the video data using syntax elements, wherein the syntax elements comprise (a) a first flag indicating whether the picture header syntax structure is present in the slice header or not, and (b) a second flag, which is in the picture parameter set, wherein in a case where the second flag has a first value, the second flag indicates that Adaptive Loop Filter (ALF) information could be present in the picture header syntax structure and is not present in the slice header referring to the picture parameter set that does not contain the picture header syntax structure, and in a case where the second flag has a second value different from the first value, the second flag indicates that ALF information is not present in the picture header syntax structure and could be present in the slice header referring to the picture parameter set, wherein in a case where the second flag has the first value, the first flag shall have a value indicating that the picture header is not present in the slice header, and wherein the ALF information comprises an adaptation parameter set id for adaptive loop filter (ALF), and an adaptation parameter set (APS) indicated by the adaptation parameter set id includes a third flag which indicates for luma if clipping indexes related to ALF are to be decoded.

10. The method according to claim 1, wherein the flag is included in the slice header.

11. The method according to claim 2, wherein the flag is included in the slice header.

12. The method according to claim 3, wherein the flag is included in the slice header.

13. The method according to claim 1, wherein the third flag is an alf_luma_clip_flag, and each of the clipping indexes correspond to an alf_luma_clip_idx.

14. The method according to claim 1, wherein the adaptation parameter set (APS) indicated by the adaptation parameter set id comprises information corresponding to the number of filter for luma.

* * * * *